(12) United States Patent
Ochiai et al.

(10) Patent No.: US 10,801,954 B2
(45) Date of Patent: Oct. 13, 2020

(54) INSPECTION APPARATUS, INSPECTION METHOD, COMPUTER PROGRAM AND RECORDING MEDIUM

(71) Applicant: PIONEER CORPORATION, Tokyo (JP)

(72) Inventors: Takanori Ochiai, Kawagoe (JP); Masakazu Ogasawara, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 25 days.

(21) Appl. No.: 16/339,917

(22) PCT Filed: Sep. 20, 2017

(86) PCT No.: PCT/JP2017/033948
§ 371 (c)(1),
(2) Date: Apr. 5, 2019

(87) PCT Pub. No.: WO2018/066360
PCT Pub. Date: Apr. 12, 2018

(65) Prior Publication Data
US 2019/0234872 A1 Aug. 1, 2019

(30) Foreign Application Priority Data

Oct. 7, 2016 (JP) ................................. 2016-198990

(51) Int. Cl.
*G01N 21/3586* (2014.01)
*G01B 11/06* (2006.01)
(Continued)

(52) U.S. Cl.
CPC ......... *G01N 21/3586* (2013.01); *G01B 11/00* (2013.01); *G01B 11/06* (2013.01);
(Continued)

(58) Field of Classification Search
CPC .......... G01N 21/6456; G01N 21/6428; G01N 2021/646; G01N 2021/6463; G01N 2201/06113
See application file for complete search history.

(56) References Cited

U.S. PATENT DOCUMENTS 5,555,472 A 9/1996 Clapis et al.
7,933,027 B1 4/2011 Roth
(Continued)

FOREIGN PATENT DOCUMENTS

CN 102770750 A 11/2012
EP 2538200 A1 12/2012
(Continued)

OTHER PUBLICATIONS

International Search Report, dated Nov. 7, 2017, from corresponding PCT application No. PCT/JP2017/033948.

*Primary Examiner* — Christine S. Kim
(74) *Attorney, Agent, or Firm* — Nixon & Vanderhye

(57) ABSTRACT

An inspection apparatus is provided with: an irradiating device configured to irradiate a sample in which a plurality of layers are laminated with a terahertz wave; a detecting device configured to detect the terahertz wave from the sample to obtain a detected waveform; and an estimating device configured to estimate a position of a first boundary surface on the basis of a second boundary surface pulse wave and a library, the second boundary surface pulse wave appearing in the detected waveform to correspond to a second boundary surface that is farther from an outer surface than the first boundary surface, the library representing an estimated waveform of the terahertz wave from the sample.

6 Claims, 14 Drawing Sheets

(51) Int. Cl.
G01B 15/02 (2006.01)
G01B 11/00 (2006.01)

(52) U.S. Cl.
CPC ...... G01B 11/0658 (2013.01); G01B 11/0666 (2013.01); G01B 15/02 (2013.01)

(56) References Cited

U.S. PATENT DOCUMENTS

| | | |
|---|---|---|
| 2012/0326037 A1 | 12/2012 | Ohtake et al. |
| 2013/0204577 A1* | 8/2013 | Savard .................. G01N 21/86 702/172 |
| 2014/0146306 A1* | 5/2014 | Kubota .................. G01B 11/06 356/51 |
| 2015/0211934 A1* | 7/2015 | Van Mechelen ... G01B 11/0625 250/339.06 |
| 2016/0069673 A1 | 3/2016 | Takayanagi et al. |
| 2017/0023469 A1* | 1/2017 | Zimdars .................. G01N 21/41 |
| 2018/0038681 A1 | 2/2018 | Van Mechelen |
| 2018/0066935 A1* | 3/2018 | Burdette .................. G01J 3/453 |
| 2018/0161812 A1* | 6/2018 | Seong .................. B05B 12/084 |
| 2019/0078873 A1* | 3/2019 | Saeedkia .................. G01S 17/10 |
| 2019/0331476 A1* | 10/2019 | Ochiai .................. G01N 21/49 |
| 2019/0383599 A1* | 12/2019 | Gregory .................. G01N 33/32 |
| 2020/0103341 A1* | 4/2020 | Ochiai .................. G01B 15/02 |

FOREIGN PATENT DOCUMENTS

| | | |
|---|---|---|
| JP | S60-203809 A | 10/1985 |
| JP | 2011/196990 A | 10/2011 |
| JP | 2012-225718 A | 11/2012 |
| JP | 2014-122875 A | 7/2014 |
| WO | 2011/105040 A1 | 9/2011 |
| WO | 2016/132452 A1 | 8/2016 |
| WO | 2016/138935 A1 | 9/2016 |

* cited by examiner

[EXAMPLE IN WHICH PULSE WAVE PW1 IS NOT CLEAR]

[EXAMPLE IN WHICH PULSE WAVE PW1 IS CLEAR]

INSPECTION APPARATUS, INSPECTION METHOD, COMPUTER PROGRAM AND RECORDING MEDIUM

TECHNICAL FIELD

The present invention relates to a technical field of an inspection apparatus and an inspection method that is configured to estimate a position of a boundary surface of a plurality of layers that constitute a sample by using a terahertz wave, a computer program that is configured to allow a computer to execute this inspection method and a recording medium on which this computer program is recorded, for example.

BACKGROUND ART

An inspection apparatus using a terahertz wave is known. A terahertz wave inspection apparatus is configured to estimate (in other words, calculate or specify) characteristics of a sample in accordance with a below described procedure. Firstly, a pump light (in other words, an excitation light) is irradiated to a terahertz wave generating element to which a bias voltage is applied, wherein the pump light is one laser light that is obtained by branching an ultrashort pulse laser light (for example, a femtosecond pulse laser light). As a result, the terahertz wave generating element generates the terahertz. The terahertz wave generated by the terahertz wave generating element is irradiated to the sample. The terahertz wave irradiated to the sample is irradiated, as a reflected terahertz wave (alternatively, a transmitted terahertz wave) from the sample, to a terahertz wave detecting element to which a probe light (in other words, an excitation light) is irradiated, wherein the probe light is another laser light that is obtained by branching the ultrashort pulse laser light and has an optical delay (namely, a difference of a length of an light path) with respect to the pump light. As a result, the terahertz wave detecting element detects the terahertz wave reflected by or transmitted through the sample. The terahertz wave inspection apparatus estimates the characteristics of the sample by analyzing the detected terahertz wave (namely, the terahertz wave in a time domain and an electrical current signal).

When the sample is a laminated object in which a plurality of layers are laminated, a thickness of the layer is one example of the characteristics that can be estimated by the terahertz wave inspection apparatus. Patent Literatures 1 and 2 disclose one example of the terahertz wave inspection apparatus that is capable of estimating the thickness.

For example, the terahertz wave inspection apparatus disclosed in the Patent Literature 1 is configured to detect a pulse waveform (namely, a pulse waveform having a peak at which an amplitude is locally maximum) appeared in the detected terahertz wave (hereinafter, it is referred to as a "detected waveform"), in order to estimate the thickness. This pulse waveform corresponds to a reflected wave of the terahertz wave from a boundary surface of a certain layer (namely, a boundary surface between one layer and another layer). Thus, the terahertz wave disclosed in the Patent Literature 1 estimates the thickness of a certain layer on the basis of a temporal difference between a plurality of pulse waveforms.

For example, the terahertz wave inspection apparatus disclosed in the Patent Literature 2 is configured to replicate a pulse waveform that is estimated to be included in the terahertz wave reflected by the sample in which the layers having a certain thickness are laminated in order to estimate the thickness and to estimate the thickness by comparing the replicated result (namely, the replicated pulse waveform) and a pulse waveform included in the detected waveform that is actually detected.

CITATION LIST

Patent Literature

[Patent Literature 1] Japanese Unexamined Patent Application Publication No. 2012-225718
[Patent Literature 2] Japanese Unexamined Patent Application Publication No. 2014-122875

SUMMARY OF INVENTION

Technical Problem

The terahertz wave inspection apparatus disclosed in each of the Patent Literatures 1 and 2 estimates the thickness on the basis of the pulse waveform included in the detected waveform. However, there is a possibility that the amplitude (in other words, an intensity) of the pulse waveform corresponding to the reflected wave from the boundary surface of a certain layer is small depending on a condition of the sample. Namely, there is a possibility that the pulse waveform does not appear clearly. In this case, the pulse waveform is buried in a noise, and as a result, an accuracy of the estimation of the thickness may deteriorate.

Note that an operation for estimating the thickness of a certain layer is substantially equivalent to an operation for estimating a position of the boundary surface of a certain layer, because the thickness is estimated on the basis of the pulse waveform corresponding to the reflected wave of the terahertz wave from the boundary surface of a certain layer The above described technical problem is one example of the technical problem to be solved by the present invention. It is therefore an object of the present invention to provide, for example, an inspection apparatus and an inspection method that is capable of properly estimating a position of a boundary surface of a plurality of layers on the basis of a terahertz wave from a sample in which the plurality of layers are laminated, a computer program that allows a computer to execute this inspection method and a recording medium on which this computer program is recorded.

Solution to Problem

First example of an inspection apparatus of the present invention is provided with: an irradiating device that is configured to irradiate an outer surface of a sample in which a plurality of layers are laminated with a terahertz wave; a detecting device that is configured to detect the terahertz wave from the sample to obtain a detected waveform; and an estimating device that is configured to estimate a position of a first boundary surface of the plurality of layers on the basis of a second boundary surface pulse wave and a library, the second boundary surface pulse wave appearing in the detected waveform to correspond to a second boundary surface of the plurality of layers, the second boundary surface being farther from the outer surface than the first boundary surface, the library indicating an estimated waveform of the terahertz wave from the sample.

First example of an inspection method of the present invention includes: an irradiating step at which a terahertz wave is irradiated to an outer surface of a sample in which a plurality of layers are laminated; a detecting step at which the terahertz wave from the sample is detected to obtain a detected waveform; and an estimating step at which a position of a first boundary surface of the plurality of layers is estimated on the basis of a second boundary surface pulse wave and a library, the second boundary surface pulse wave appearing in the detected waveform to correspond to a second boundary surface of the plurality of layers, the second boundary surface being farther from the outer surface than the first boundary surface, the library indicating an estimated waveform of the terahertz wave from the sample.

First example of a computer program of the present invention is allow a computer to execute the above described first example of the inspection method of the present invention.

First example of a recording medium of the present invention is a recording medium on which the above described first example of the computer program of the present invention is recorded.

DESCRIPTION OF EMBODIMENTS

Figure 1:
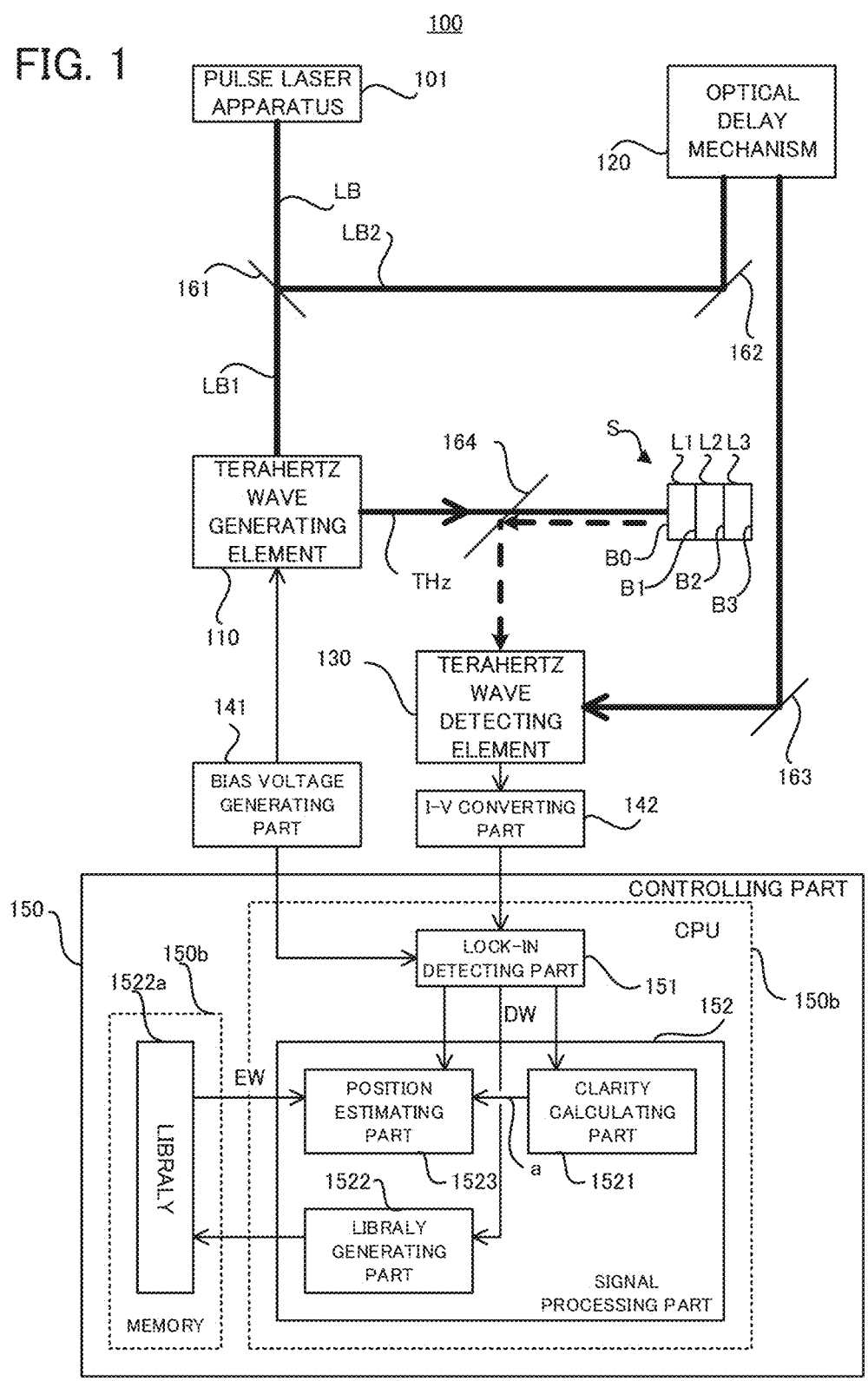
FIG. 1 is a block diagram that illustrates a structure of a terahertz wave inspection apparatus in a first example.

Hereinafter, one embodiment of an inspection apparatus, an inspection method, a computer program and a recording medium will be described.

Embodiment of Inspection Apparatus

<1>

An inspection apparatus in the present embodiment is provided with: an irradiating device that is configured to irradiate an outer surface of a sample in which a plurality of layers are laminated with a terahertz wave; a detecting device that is configured to detect the terahertz wave from the sample to obtain a detected waveform; and an estimating device that is configured to estimate a position of a first boundary surface of the plurality of layers on the basis of a second boundary surface pulse wave and a library, the second boundary surface pulse wave appearing in the detected waveform to correspond to a second boundary surface of the plurality of layers, the second boundary surface being farther from the outer surface than the first boundary surface, the library indicating an estimated waveform of the terahertz wave from the sample.

According to the inspection apparatus in the present embodiment, the position of the first boundary surface is properly estimated on the basis of the second boundary surface pulse wave as described in the below described example in detail. This is because the second boundary surface pulse wave corresponds to the terahertz wave that propagates from the sample via not only the second boundary surface but also the first boundary surface, because the second boundary surface is located at a farther position from the outer surface than the first boundary surface, and thus, the second boundary surface pulse wave includes an information relating to the first boundary surface. Thus, the inspection apparatus is capable of properly estimating the position of the first boundary surface even when a first boundary surface pulse wave does not appear clearly (for example, is buried in a noise or a variability is large at every detection).

<2>

In another aspect of the inspection apparatus in the present embodiment, the sample includes a plurality of second boundary surfaces, the estimating device is configured to estimate the position of the first boundary surface on the basis of one second boundary surface pulse wave of a plurality of second boundary surface pulse waves, a clarity degree of the one second boundary surface pulse wave is equal to or larger than a first threshold value, the plurality of second boundary surface pulse waves appear in the detected waveform to correspond to the plurality of second boundary surfaces, respectively.

According to this aspect, the inspection apparatus is capable of properly estimating the position of the first boundary surface on the basis of the one second boundary surface pulse wave having the clarity degree that is equal to or larger than the first threshold value.

<3>

In another aspect of the inspection apparatus in the present embodiment, the sample includes a plurality of second boundary surfaces, the estimating device is configured to estimate the position of the first boundary surface on the basis of one second boundary surface pulse wave of a plurality of second boundary surface pulse waves, a clarity degree of the one second boundary surface pulse wave is the largest, the plurality of second boundary surface pulse waves appear in the detected waveform to correspond to the plurality of second boundary surfaces, respectively.

According to this aspect, the inspection apparatus is capable of properly estimating the position of the first boundary surface on the basis of the one second boundary surface pulse wave that is the clearest.

<4>

In another aspect of the inspection apparatus in the present embodiment, the sample includes a plurality of second boundary surfaces, the estimating device is configured to estimate the position of the first boundary surface on the basis of one second boundary surface pulse wave of a plurality of second boundary surface pulse waves, the one second boundary surface pulse wave corresponds to one second boundary surface that forms a boundary between substances having different phases, the plurality of second boundary surface pulse waves appear in the detected waveform to correspond to the plurality of second boundary surfaces, respectively.

According to this aspect, the inspection apparatus is capable of properly estimating the position of the first boundary surface on the basis of the one second boundary surface pulse wave corresponding to the one second boundary surface that forms the boundary between the substances having the different phases. Note that there is a high possibility that the substances having the different phases (for example, one substance that is a solid and another substance that is a gas) are substances between which a difference of a refractive index is large. Thus, there is a high possibility that a reflectance of the one second boundary surface is relatively large, and as a result, there is a high possibility that the second boundary surface pulse wave corresponding to the one second boundary surface is clear.

<5>

In another aspect of the inspection apparatus in the present embodiment, the sample includes a plurality of second boundary surfaces, the estimating device is configured to estimate the position of the first boundary surface on the basis of one second boundary surface pulse wave of a plurality of second boundary surface pulse waves, the one second boundary surface pulse wave corresponds to one second boundary surface that is the farthest from the outer surface, the plurality of second boundary surface pulse waves appear in the detected waveform to correspond to the plurality of second boundary surfaces, respectively.

According to this aspect, the inspection apparatus is capable of properly estimating the position of the first boundary surface on the basis of the one second boundary surface pulse wave corresponding to the one second boundary surface the farthest from the outer surface. Note that there is a high possibility that the one second boundary surface that is the farthest from the outer surface forms the boundary surface between the substances having the different phases. This is because there is a high possibility that the one second boundary surface that is the farthest from the outer surface is a rear surface of the sample.

<6>

In another aspect of the inspection apparatus in the present embodiment, the estimating device is configured to estimate the position of the first boundary surface on the basis of a similarity degree of the second boundary surface pulse wave between the detected waveform and the estimated waveform.

According to this aspect, the inspection apparatus is capable of properly estimating the position of the first boundary surface on the basis of the similarity degree.

<7>

In another aspect of the inspection apparatus in the present embodiment, the estimating device is configured to estimate the position of the first boundary surface without using a first boundary surface pulse wave corresponding to the first boundary surface.

According to this aspect, the inspection apparatus is capable of properly estimating the position of the first boundary surface even when the first boundary surface pulse wave does not appear clearly.

<8>

In another aspect of the inspection apparatus in the present embodiment, the estimating device is configured (i) to estimate the position of the first boundary surface on the basis of a first boundary surface pulse wave corresponding to the first boundary surface, the second boundary surface pulse wave and the library when a clarity degree of the first boundary surface pulse wave is larger than a second threshold value, and (ii) to estimate the position of the first boundary surface on the basis of the second boundary surface pulse wave and the library without using the first boundary surface pulse wave when the clarity degree of the first boundary surface pulse wave is smaller than the second threshold value.

According to this aspect, the inspection apparatus is capable of properly estimating the position of the first boundary surface even when the first boundary surface pulse wave does not appear clearly.

Embodiment of Inspection Method

<9>

An inspection method in the present embodiment includes: an irradiating step at which a terahertz wave is irradiated to an outer surface of a sample in which a plurality of layers are laminated; a detecting step at which the terahertz wave from the sample is detected to obtain a detected waveform; and an estimating step at which a position of a first boundary surface of the plurality of layers is estimated on the basis of a second boundary surface pulse wave and a library, the second boundary surface pulse wave appearing in the detected waveform to correspond to a second boundary surface of the plurality of layers, the second boundary surface being farther from the outer surface than the first boundary surface, the library indicating an estimated waveform of the terahertz wave from the sample.

According to the inspection method in the present embodiment, it is possible to achieve an effect that is same as an effect achievable by the above described inspection apparatus in the present embodiment.

Note that the inspection method in the present embodiment may adopt various aspects in accordance with the various aspects that are adopted by the inspection apparatus in the present embodiment.

Embodiment of Computer Program

<10>

A computer program in the present embodiment allows a computer to execute the above described inspection method in the present embodiment.

According to the computer program in the present embodiment, it is possible to achieve an effect that is same as an effect achievable by the above described inspection apparatus in the present embodiment.

Note that the computer program in the present embodiment may adopt various aspects in accordance with the various aspects that are adopted by the inspection apparatus in the present embodiment.

<10>

A recording medium in the present embodiment is a recording medium on which the above described computer program in the present embodiment.

According to the recording medium in the present embodiment, it is possible to achieve an effect that is same as an effect achievable by the above described inspection apparatus in the present embodiment.

Note that the recording medium in the present embodiment may adopt various aspects in accordance with the various aspects that are adopted by the inspection apparatus in the present embodiment.

These operations and other advantages of the inspection apparatus, the inspection method, the computer program and the recording medium in the present embodiment will become more apparent from the examples explained below.

As described above, the inspection apparatus in the present embodiment is provided with the irradiating device, the detecting device and the estimating device. The inspection method in the present embodiment includes the irradiating step, the detecting step and the estimating step. The computer program in the present embodiment allows the computer to execute the inspection method in the present embodiment. The recording medium in the present embodiment is a recording medium on which the computer program in the present embodiment is recorded. Thus, it is possible to properly estimate the position of the boundary surface of the plurality of layers on the basis of the terahertz wave from the sample in which the plurality of layers are laminated.

EXAMPLE

Hereinafter, with reference to drawings, an example of an inspection apparatus, an inspection method, a computer program and a recording medium will be described. Especially, in the below described description, an example in which the inspection apparatus, the inspection method, the computer program and the recording medium are adapted to a terahertz wave inspection apparatus will be described. Note that the terahertz wave inspection apparatus is configured to estimate a position of a boundary surface of a plurality of layers by detecting a terahertz wave from a sample in which the plurality of layers are laminated (layered).

(1) Terahertz Wave Inspection Apparatus 100 in First Example

Firstly, with reference to FIG. 1 to FIG. 8B, a terahertz wave inspection apparatus 100 in a first example will be described.

(1-1) Structure of Terahertz Wave Inspection Apparatus 100

Firstly, with reference to FIG. 1, a structure of the terahertz wave inspection apparatus 100 in the first example will be described. FIG. 1 is a block diagram that illustrates the structure of the terahertz wave inspection apparatus 100 in the first example As illustrated in FIG. 1, the terahertz wave inspection apparatus 100 is configured to irradiate a sample S in which a plurality of layers L are laminated with a terahertz wave THz propagating along a direction that intersects with a laminated direction of the plurality of layers L. Moreover, the terahertz wave inspection apparatus 100 is configured to detect the terahertz wave THz reflected by the sample S (namely, the terahertz wave THz irradiated to the sample S).

The terahertz wave THz is an electromagnetic wave including an electromagnetic wave component in a frequency range around one terahertz (1 THz=10^12 Hz) (namely, in a terahertz range). The terahertz range is a frequency range having characteristics of a straight propagating ability of a light and a transmitting ability of the electromagnetic wave. The terahertz range is a frequency range in which various substances have unique spectrums. Therefore, the terahertz wave inspection apparatus 100 is capable of estimating (in other words, measuring) characteristics of the sample S by analyzing the terahertz wave THz irradiated to the sample S.

In the first example, the sample S in which three layers L (specifically, a layer L1, a layer L2 and a layer L3) are laminated is used for the description. The layer L1 to the layer L3 are made from substances having different physicality from one another, respectively. At least one of the layer L1 to the layer L3 may be made from a solid material. At least one of the layer L1 to the layer L3 may be made from a liquid material. At least one of the layer L1 to the layer L3 may be made from a gaseous material.

The terahertz wave inspection apparatus 100 is configured to estimate, as the characteristics of the sample S, a position of a boundary surface B of the plurality of layers L that constitutes the sample S. Here, the boundary surface B is a surface that forms a boundary of the layer L. Especially, the boundary surface B is a surface that intersects with an irradiation direction of the terahertz wave THz, because the terahertz wave inspection apparatus 100 estimates the position of the boundary surface B. In the first example, there are a boundary surface B0, a boundary surface B1, a boundary surface B2 and a boundary surface B3, as the boundary surface B. The layer L1 faces an outside of the sample S via the boundary surface B0. Namely, the boundary surface B0 forms a boundary between the layer L1 and the outside of the sample S. Note that the boundary surface B0 is referred to as an "outer surface B0" in the below described description, because the boundary surface B0 is the outer surface of the sample S. The layer L1 faces the layer L2 via the boundary surface B1. Namely, the boundary surface B1 forms a boundary between the layer L1 and the layer L2. The layer L2 faces the layer L3 via the boundary surface B2. Namely, the boundary surface B2 forms the layer L2 and the layer L3. The layer L3 faces the outside of the sample S via the boundary surface B3. Namely, the boundary surface B3 forms a boundary between the layer L3 and the outside of the sample S. Note that the boundary surface B3 is referred to as a "rear surface B3" in the below described description, because the boundary surface B3 is the rear surface of the sample S.

A cycle of the terahertz wave THz that is irradiated to the sample S in order to estimate the position of the boundary surface B is a cycle on the order of sub-pico seconds, and thus, it is technically difficult to directly detect a waveform of the terahertz wave THz. Thus, the terahertz wave inspection apparatus 100 is configured to indirectly detect the waveform of the terahertz wave THz by using a pump probe method based on a time delay scanning. Next, the terahertz wave inspection apparatus 100 using the pump probe method will be described in detail.

As illustrated in FIG. 1, the terahertz wave inspection apparatus 100 is provided with a pulse laser apparatus 101, a terahertz wave generating element 110 that is one specific example of the "irradiating device", a beam splitter 161, a reflective mirror 162, a reflective mirror 163, a half mirror 164, an optical delay mechanism 120, a terahertz wave detecting element 130 that is one specific example of the "detecting device", a bias voltage generating part 141, a I-V (electrical current—electrical voltage) converting part 142 and a controlling part 150.

The pulse laser apparatus 101 is configured to generate a pulse laser light LB that is on the order of the sub-pico seconds or a femto seconds and that has a light intensity based on a driving electrical current inputted to the pulse laser apparatus 101. The pulse laser light LB generated by the pulse laser apparatus 101 enters the beam splitter 161 via a not-illustrated light guiding path (for example, an optical fiber).

The beam splitter 161 is configured to divide (branch) the pulse laser light LB into a pump light LB1 and a probe light LB2. The pump light LB1 enters the terahertz wave generating element 110 via a not-illustrated light guiding path. On the other hand, the probe light LB2 enters the optical delay mechanism 120 via a not-illustrated light guiding path and the reflective mirror 162. Then, the probe light LB2 emitted from the optical delay mechanism 120 enters the terahertz wave detecting element 130 via the reflective mirror 163 and a not-illustrated light guiding path.

The terahertz wave generating element 110 is configured to emit the terahertz wave THz. Specifically, the terahertz wave generating element 110 has a pair of electrodes that face with each other through a gap. A bias voltage generated by the bias voltage generating part 141 is applied to the gap via a pair of electrodes. When the pump light LB1 is irradiated to the gap in the situation where an effective bias voltage (for example, the bias voltage that is not 0 volt) is applied to the gap, the pump light LB1 is also irradiated to a photoconductive layer formed under the gap. In this case, a carrier is generated by a photoexcitation caused by the pump light LB1 at the photoconductive layer to which the pump light LB1 is irradiated. As a result, a pulsed electrical current signal on the order of the sub-pico seconds or a femto seconds based on the generated carrier is generated at the terahertz wave generating element 110. The generated electrical current signal flows through a pair of the electrodes. As a result, the terahertz wave generating element 110 emits the terahertz wave THz caused by the pulsed electrical current signal.

The terahertz wave THz emitted from the terahertz wave generating element 110 passes through the half mirror 164. As a result, the terahertz wave THz passing through the half mirror 164 is irradiated to the sample S (especially, the outer surface B0 of the layer L1). The terahertz wave THz irradiated to the sample S is reflected by the sample S (especially, each of the outer surface B0, the boundary surface B1, the boundary surface B2 and the rear surface B3). The terahertz wave THz reflected by the sample S is reflected by the half mirror 164. The terahertz wave THz reflected by the half mirror 164 enters the terahertz wave detecting element 130.

The terahertz wave detecting element 130 is configured to detect the terahertz wave THz entering the terahertz wave detecting element 130. Specifically, the terahertz wave detecting element 130 has a pair of electrodes that face with each other through a gap. When the probe light LB2 is irradiated to the gap, the probe light LB2 is also irradiated to a photoconductive layer formed under the gap. In this case, a carrier is generated by a photoexcitation caused by the probe light LB2 at the photoconductive layer to which the probe light LB2 is irradiated. As a result, an electrical current signal based on the carrier flows through a pair of the electrodes. When the terahertz wave THz is irradiated to the terahertz wave detecting element 130 in the situation where the probe light LB2 is irradiated to the gap, a signal intensity of the electrical current flowing through a pair of the electrodes varies depending on a light intensity of the terahertz wave THz. The electrical current having the signal intensity that varies depending on the light intensity of the terahertz wave THz is outputted to the I-V converting part 142 via a pair of the electrodes.

The optical delay mechanism 120 is configured to adjust a difference between a length of a light path of the pump light LB1 and a length of a light path of the probe light LB2 (namely, a light path length difference). Specifically, the optical delay mechanism 120 adjusts the light path length difference by adjusting the length of the light path of the probe light LB2. When the light path length difference is adjusted, a temporal difference between a timing at which the pump light LB1 enters the terahertz wave generating element 110 (alternatively, a timing at which the terahertz wave generating element 110 emits the terahertz wave THz) and a timing at which the probe light LB2 enters the terahertz wave detecting element 130 (alternatively, a timing at which the terahertz wave detecting element 130 detects the terahertz wave THz). The terahertz wave inspection apparatus 100 indirectly detects the waveform of the terahertz wave THz by adjusting this temporal difference. For example, when the optical delay mechanism 120 increases the length of the light path of the probe light LB2 by 0.3 mm (note that this is a length of the light path in the air), the timing at which the probe light LB2 enters the terahertz wave detecting element 130 is delayed by 1 pico second. In this case, the timing at which the terahertz wave detecting element 130 detects the terahertz wave THz is delayed by 1 pico second. Considering that the terahertz wave THz having same waveform repeatedly enters the terahertz wave detecting element 130 with a cycle of several dozen of megahertz, gradually shifting the timing at which the terahertz wave detecting element 130 detects the terahertz wave THz allows the terahertz wave detecting element 130 to indirectly detect the waveform of the terahertz wave THz. Namely, the waveform of the terahertz wave THz is detectable on the basis of the detected result of the terahertz wave detecting element 130 by a below described lock-in detecting part 151.

The electrical current outputted from the terahertz wave detecting element 130 is converted into a voltage signal by the I-V converting part 142.

The controlling part 150 is configured to execute a control operation for controlling an entire operation of the terahertz wave inspection apparatus 100. The controlling part 150 has a CPU (Central Processing Unit) 150a and a memory 150b. A computer program that allows the controlling part 150 to execute the control operation is recorded in the memory 150b. When the CPU 150a executes this computer program, a logical processing block for executing the control operation is generated in the CPU 150a. However, the computer program may not be recorded in the memory 150b. In this case, the CPU 150a may execute the computer program downloaded via a network.

The controlling part 150 is configured to execute, as one example of the control operation, an estimation operation for estimating the characteristics of the sample S on the basis of the detected result of the terahertz wave detecting element 130 (namely, the voltage signal outputted from the I-V converting part 142). In order to execute the estimation operation, the controlling part 150 has, as logical processing blocks generated in the CPU 150a, the lock-in detecting part 151 that is one specific example of the "detecting device" and a signal processing part 152.

The lock-in detecting part 151 is configured to execute a synchronous detection on the voltage signal outputted from the I-V converting part 142 by using the bias voltage generated by the bias voltage generating part 141 as a reference signal. As a result, the lock-in detecting part 151 detects a sampled value of the terahertz wave THz. Same operation is repeated while adjusting the difference between the length of the light path of the pump light LB1 and the length of the light path of the probe light LB2 (namely, the light path length difference), and as a result, the lock-in detecting part 151 detects the waveform (a temporal waveform) of the terahertz wave THz detected by the terahertz wave detecting element 130. The lock-in detecting part 151 outputs, to the signal processing part 152, a detected waveform DW (namely, a waveform signal representing the detected waveform DW) that is the waveform of the terahertz wave THz detected by the terahertz wave detecting element 130. Namely, the lock-in detecting part 151 eliminates, from the voltage signal outputted from the I-V converting part 142, a noise component having a frequency that is different from that of the reference signal. Namely, the lock-in detecting part 151 detects the detected waveform DW with a relatively high sensitivity and relatively high accuracy by executing the synchronous detection on the basis of the reference signal and the voltage signal outputted from the I-V converting part 142. Note that a DC voltage may be applied to the terahertz wave generating element 110 as the bias voltage when the terahertz wave inspection apparatus 100 does not use a lock-in detection.

Figure 2A:
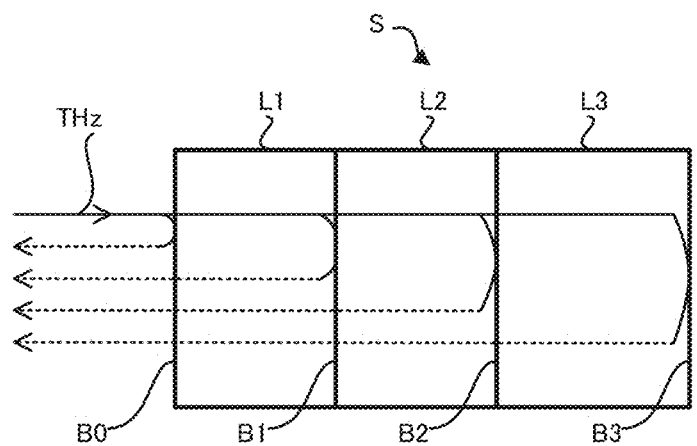
FIG. 2A is a cross-sectional diagram of a sample that illustrates an optical path of a terahertz wave irradiated to the sample and an optical path of the terahertz wave reflected by the sample.

Here, with reference to FIG. 2A to FIG. 2B, the detected waveform DW will be described. As illustrated in FIG. 2A, the terahertz wave THz is irradiated to the outer surface B0 of the sample S. One portion of the terahertz wave THz irradiated to the outer surface B0 is reflected by the outer surface B0. The terahertz wave THz reflected by the outer surface B0 propagates from the sample S to the terahertz wave detecting element 130. One portion of the terahertz wave THz irradiated to the outer surface B0 passes through the outer surface B0 without being reflected by the outer surface B0. The terahertz wave THz passing through the outer surface B0 passes through the inside of the sample S. Then, one portion of the terahertz wave THz passing through the outer surface B0 is reflected by the boundary surface B1 and another one portion of the terahertz wave THz passing through the outer surface B0 passes through the boundary surface B1. One portion of the terahertz wave THz passing through the boundary surface B1 is reflected by the boundary surface B2 and another one portion of the terahertz wave THz passing through the boundary surface B1 passes through the boundary surface B2. One portion of the terahertz wave THz passing through the boundary surface B2 is reflected by the rear surface B3. Thus, each of the terahertz wave THz reflected by the boundary surface B1, the terahertz wave THz reflected by the boundary surface B2 and the terahertz wave THz reflected by the rear surface B3 also propagates from the sample S to the terahertz wave detecting element 130.

Figure 2B:
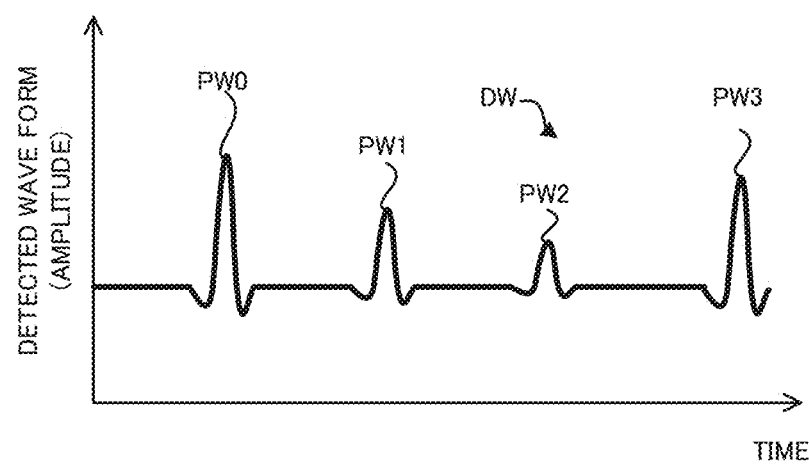
FIG. 2B is a waveform diagram that illustrates a detected waveform.

As a result, as illustrated in FIG. 2B, a pulse wave PW0 corresponding to the terahertz wave THz reflected by the outer surface B0, a pulse wave PW1 corresponding to the terahertz wave THz reflected by the boundary surface B1, a pulse wave PW2 corresponding to the terahertz wave THz reflected by the boundary surface B2 and a pulse wave PW3 corresponding to the terahertz wave THz reflected by the boundary surface B3 appear in the detected waveform DW Again in FIG. 1, the signal processing part 152 is configured to estimate the characteristics of the sample S on the basis of the detected waveform DW outputted from the lock-in detecting part 151. For example, the signal processing part 152 is configured to obtain a frequency spectrum of the terahertz wave THz by using a terahertz time domain spectroscopy and to estimate the characteristics of the sample S on the basis of the frequency spectrum.

Especially in the present example, the signal processing part 152 is configured to execute, as one example of the control operation, an estimation operation for estimating the positions of the boundary surface B1 and the boundary surface B2 on the basis of the detected waveform DW. In order to execute the estimation operation, the signal processing part 152 has, as logical processing blocks generated in the CPU 150a, a clarity calculating part 1521, a library generating part 1522 and a position estimating part that is one specific example of the "estimating device". Note that the specific example of the operation of each of the clarity calculating part 1521, the library generating part 1522 and the position estimating part 1523 will be described later in detail and thus its description is omitted here.

(1-2) Estimation Operation for Estimating Positions of Boundary Surface B1 and Boundary Surface B2 Executed by Terahertz Wave Inspection Apparatus 100

Figure 3:
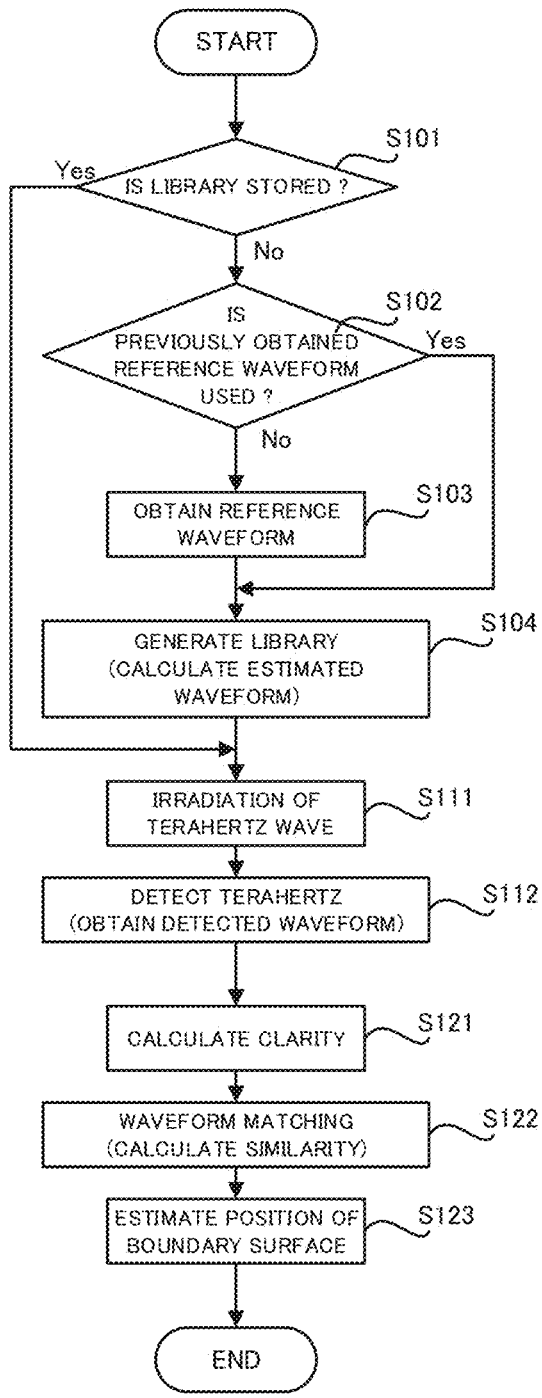
FIG. 3 is a flowchart that illustrates one example of a flow of an estimation operation for estimating a position of a boundary surface executed by the terahertz wave inspection apparatus in the first example.

Next, with reference to FIG. 3, the estimating operation for estimating the positions of the boundary surface B1 and the boundary surface B2 executed by the terahertz wave inspection apparatus 100 will be described. FIG. 3 is a flowchart that illustrates one example of a flow of the estimating operation for estimating the positions of the boundary surface B1 and the boundary surface B2 executed by the terahertz wave inspection apparatus 100.

As illustrated in FIG. 3, firstly, the library generating part 1522 determines whether or not a library 1522a that is used to estimate the positions of the boundary surface B1 and the boundary surface B2 is stored in the memory 150b of the controlling part 150 (alternatively, any recording medium) (a step S101). Specifically, the library generating part 1522 determines whether or not the library 1522a previously generated by the library generating part 1522 is stored in the memory 150b.

Here, with reference to FIG. 4, the library 1522a will be described. The library 1522a stores the waveform of the terahertz wave THz that is estimated to be detected by the terahertz wave detecting element 130 when the terahertz wave THz is irradiated to the sample S (namely, a result of the estimation of the detected waveform DW). Hereinafter, the waveform of the terahertz wave THz included in the library 1522a is referred to as an "estimated waveform EW". Especially, the library 1522a stores the estimated waveform EW with the estimated waveform EW being associated with expected candidate positions of the boundary surface B1 and the boundary surface B2 in the sample S. Namely, the library 1522a stores, for each of the plurality of candidate positions, a plurality of waveforms (namely, the estimated waveforms EW) of the terahertz waves THz each of which is estimated to be detected by the terahertz wave detecting element 130 when the terahertz wave THz is irradiated to the sample S in which each of the boundary surface B1 and the boundary surface B2 are at a certain candidate position.

Figure 4:
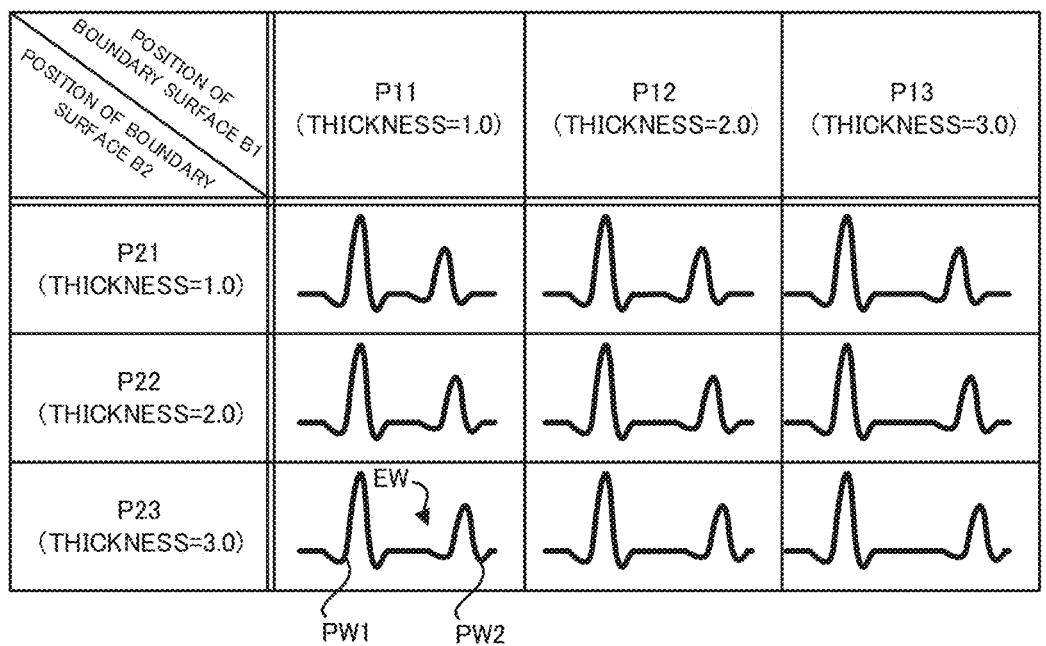
FIG. 4 is a table that illustrates a library indicating a correspondence relationship between a candidate position of the boundary surface and an estimated waveform.

For example, in an example illustrated in FIG. 4, the library 1522a stores (i) the estimated waveform EW corresponding to the sample S in which the boundary surface B1 is at a candidate position P11 and the boundary surface B2 is at a candidate position P21, (ii) the estimated waveform EW corresponding to the sample S in which the boundary surface B1 is at the candidate position P11 and the boundary surface B2 is at a candidate position P22, (iii) the estimated waveform EW corresponding to the sample S in which the boundary surface B1 is at the candidate position P11 and the boundary surface B2 is at a candidate position P23, (iv) the estimated waveform EW corresponding to the sample S in which the boundary surface B1 is at a candidate position P12 and the boundary surface B2 is at the candidate position P21, (v) the estimated waveform EW corresponding to the sample S in which the boundary surface B1 is at the candidate position P12 and the boundary surface B2 is at the candidate position P22, (vi) the estimated waveform EW corresponding to the sample S in which the boundary surface B1 is at the candidate position P12 and the boundary surface B2 is at the candidate position P23, (vii) the estimated waveform EW corresponding to the sample S in which the boundary surface B1 is at a candidate position P13 and the boundary surface B2 is at the candidate position P21, (viii) the estimated waveform EW corresponding to the sample S in which the boundary surface B1 is at the candidate position P13 and the boundary surface B2 is at the candidate position P22, (ix) the estimated waveform EW corresponding to the sample S in which the boundary surface B1 is at the candidate position P13 and the boundary surface B2 is at the candidate position P23. As can be seen by FIG. 4, when the candidate position of the boundary surface B1 is changed, the position of the pulse wave PW1 corresponding to the boundary surface B1 is also changed in the estimated wave form. Similarly, when the candidate position of the boundary surface B2 is changed, the position of the pulse wave PW1 corresponding to the boundary surface B2 is also changed in the estimated wave form.

Incidentally, when the position of the boundary surface B1 is changed, a thickness of the layer L1 is also changed. Similarly, when the position of the boundary surface B2 is changed, a thickness of each of the layer L1 and the layer L2 is also changed. Therefore, it can be said that the library 1522a substantially stores, for each of a plurality of candidate of the thickness, a plurality of waveforms (namely, the estimated waveforms EW) of the terahertz waves THz each of which is estimated to be detected by the terahertz wave detecting element 130 when the terahertz wave THz is irradiated to the sample S in which the thickness of each of the boundary surface B1 and the boundary surface B2 is a certain thickness.

Again in FIG. 3, as a result of the determination at the step S101, when it is determined that the library 1522a is stored in the memory 150b (the step S101: Yes), the library generating part 1522 does not newly generate the library 1522a. Thus, the controlling part 150 estimates the positions of the boundary surface B1 and the boundary surface B2 by using the existing library 1522a stored in the memory 150b.

On the other hand, as a result of the determination at the step S101, when it is determined that the library 1522a is not stored in the memory 150b (the step S101: No), the library generating part 1522 newly generates the library 1522a (a step S102 to a step S104). Specifically, the library generating part 1522 determines whether or not the library 1522a is generated by using a reference waveform BW that is already obtained previously (the step S102). Note that the reference waveform BW is the waveform of the terahertz wave THz detected by the terahertz wave detecting element 130 when the terahertz wave THz is irradiated to the sample S (alternatively, any object that is different from the sample S) and is the waveform of the terahertz wave THz that is used as a standard to generate the library 1522a.

As a result of the determination at the step S102, when it is determined that the library 1522a is not generated by using the reference waveform BW that is already obtained previously (the step S102: No), the library generating part 1522 newly obtains the reference waveform BW (the step S102). Specifically, the terahertz wave THz is irradiated to the sample S (alternatively, any object that is different from the sample S) under the control of the library generating part 1522. As a result, the detected waveform DW is obtained. At least one portion of the detected waveform DW (for example, the pulse wave PW0 corresponding to the outer surface B0) is used as the reference waveform BW.

On the other hand, as a result of the determination at the step S102, when it is determined that the library 1522a is generated by using the reference waveform BW that is already obtained previously (the step S102: Yes), the library generating part 1522 does not newly obtain the reference waveform BW.

Then, the library generating part 1522 generates the library 1522a by using the reference waveform BW (the step S104). Specifically, firstly, the library generating part 1522 sets, on a simulation model that simulates the sample S, physicality (for example, a permittivity, a magnetic permeability, an attenuation rate, an electrical conductivity and the like) of each of the layer L1 to the layer L3 to an actually measured value that is obtained by actually measuring the physicality of each of the layer L1 to the layer L3 in advance. Then, the library generating part 1522 calculates (in other words, replicates) the estimated waveform EW while changing the positions of the boundary surface B1 and the boundary surface B2 on the simulation model. Note that the library generating part 1522 may use an existing method for simulating the waveform of the electromagnetic wave as a method of calculating the estimated waveform EW. A FDTD (Finite Difference Time Domain) method or an ADE-FDTD (Auxiliary Differential Equation FDTD) method is one example of the existing method.

Then, the terahertz wave generating element 110 emits the terahertz wave THz to the outer surface B0 of the sample S (a step S111). As a result, the terahertz wave detecting element 130 detects the terahertz wave THz reflected by the sample S (a step S112). Namely, the signal processing part 152 obtains the detected waveform DW (the step S112).

Then, the clarity calculating part 1521 calculates a clarity degree a (a degree of a clarity) of the detected waveform DW (a step S121). The clarity degree a is an index that represents whether or not the detected waveform DW is so clear that the positions of the boundary surface B1 and the boundary surface B2 are estimated properly (in other words, with a high accuracy). The clarity degree a becomes smaller as the detected waveform DW is more unclear (namely, a possibility that the positions of the boundary surface B1 and the boundary surface B2 cannot be estimated properly becomes higher).

In the present example, the clarity calculating part 1521 calculates, as the clarity degree a, a clarity degree a1 of the pulse wave PW1 corresponding to the above described boundary surface B1 and a clarity degree a2 of the pulse wave PW2 corresponding to the boundary surface B2. It is preferable that the pulse wave PW1 be not buried in a noise, in order to estimate the position of the boundary surface B1 with the high accuracy. It is preferable that the amplitude of the pulse wave PW be large to some extent, in order to allow the pulse wave PW1 not to be buried in the noise. Namely, the possibility that the position of the boundary surface B1 is estimated with high accuracy becomes higher as the amplitude of the pulse wave PW becomes larger. Therefore, in the present example, the clarity degree a1 of the pulse wave PW1 is an index determined on the basis of the amplitude of the pulse wave PW1. Specifically, the clarity degree a1 of the pulse wave PW1 is an index that becomes larger as the amplitude (especially, a maximum amplitude) of the pulse wave PW1 becomes larger. Namely, the clarity degree a1 of the pulse wave PW1 is an index that is positively correlated with the amplitude of the pulse wave PW1. The clarity degree a2 of the pulse wave PW2 is also an index that becomes larger as the amplitude (especially, a maximum amplitude) of the pulse wave PW2 becomes larger.

Figure 5A:
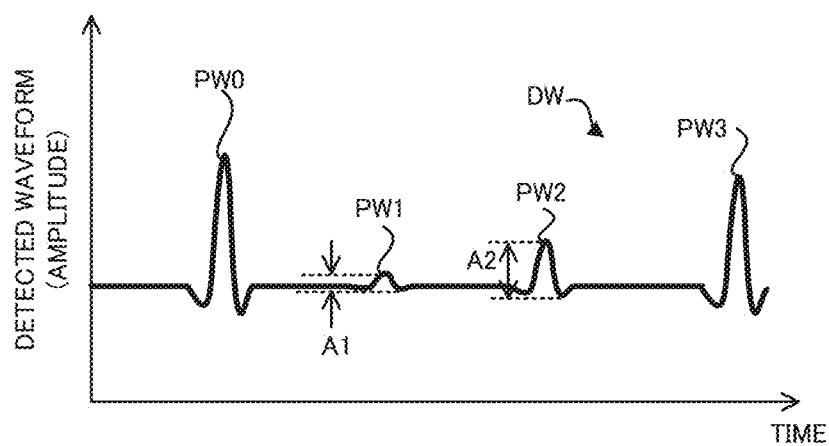
FIG. 5A is a waveform diagram that illustrates, on the detected waveform, an operation for calculating a clarity degree on the basis of the detected waveform.
Figure 5B:
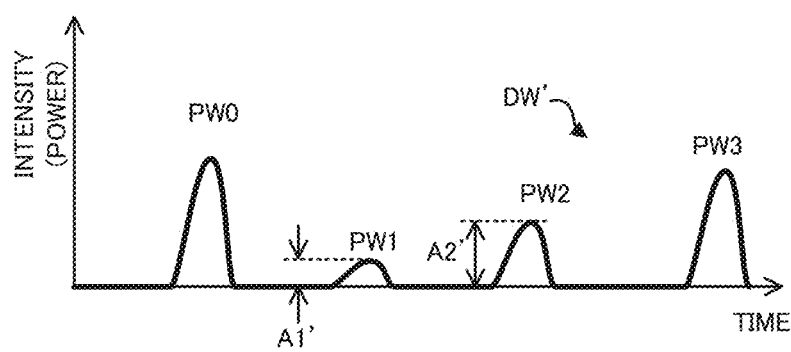

Here, with reference to FIG. 5A and FIG. 5B, the clarity degrees a1 and a2 will be described more in detail. FIG. 5A illustrates one example of the detected waveform DW. FIG. 5A illustrates an example in which the maximum amplitude of the pulse wave PW1 is A1 and the maximum amplitude of the pulse wave PW2 is A2. In the present example, the clarity degree a1 is a ratio of the maximum amplitude A1 of the pulse wave PW1 to a total sum of the maximum amplitude A1 of the pulse wave PW1 and the maximum amplitude A2 of the pulse wave PW2 (alternatively, a value that is positively correlated with this ratio). Similarly, the clarity degree a2 is a ratio of the maximum amplitude A2 of the pulse wave PW2 to the total sum of the maximum amplitude A1 of the pulse wave PW1 and the maximum amplitude A2 of the pulse wave PW2 (alternatively, a value that is positively correlated with this ratio). Namely, $a1=A1/(A1+A2)$ and $a2=A2/(A1+A2)$.

However, there is a possibility that at least one of the pulse wave PW1 and the pulse wave PW2 is not clear (namely, is buried in the noise) depending on the condition of the detected waveform DW. In this case, there is a possibility that at least one of the maximum amplitude A1 of the pulse wave PW1 and the maximum amplitude A2 of the pulse wave PW2 cannot be calculated properly. Thus, the clarity calculating part 1521 may convert the detected waveform DW to a detected waveform DW' from which the maximum amplitude A1 of the pulse wave PW1 and the maximum amplitude A2 of the pulse wave PW2 can be calculated properly and calculate the clarity degree a1 and the clarity degree a2 on the basis of the detected waveform DW'. Next, one example of an operation for calculating the clarity degree a1 and the clarity degree a2 on the basis of the detected waveform DW' will be described. For example, the clarity calculating part 1521 executes a continuous wavelet conversion on the detected waveform DW to generate a time-frequency map of the detected waveform DW. Then, the clarity calculating part 1521 extracts, as the detected waveform DW', a waveform component corresponding to a specific frequency from the map. For example, the clarity calculating part 1521 extracts, as the detected waveform DW', a waveform component corresponding to a frequency at which the pulse wave PW1 and the pulse wave PW2 are relatively clear from the map. For example, the clarity calculating part 1521 extracts, as the detected waveform DW', a waveform component corresponding to a relatively low frequency (for example, a hundred and several dozen of gigahertz) in the frequency range (for example, the frequency range from 100 GHz to 1 THz, for example) of the terahertz wave THz from the map. Note that FIG. 5 illustrates one example of the detected waveform DW'. Then, the clarity calculating part 1521 calculates a maximum intensity A1' of the pulse wave PW1 and a maximum intensity A2' of the pulse wave PW2 on the basis of the detected waveform DW'. Note that the detected waveform DW' is represented in units of intensity that is proportional to a square value of the amplitude of the detected waveform DW due to the wavelet conversion. Then, the clarity calculating part 1521 calculate the clarity degrees a1 and a2 by using an equation of $a1=A1'/(A1'+A2')$ and an equation of $a2=A2'/(A1'+A2')$.

Again in FIG. 3, then, the position estimating part 1523 executes a matching between the detected waveform DW obtained at the step S112 and the estimated waveform(s) EW stored in the library 1522a (a step S122). Specifically, the position estimating part 1523 calculates a similarity degree (a degree of a similarity) R between the detected waveform DW and the estimated waveform EW. Note that the similarity degree R is an index that represents how similar the detected waveform DW and the estimated waveform EW are with each other. Thus, the similarity degree R is an index that becomes larger as the detected waveform DW and the estimated waveform EW are more similar with each other. Namely, the similarity degree R is substantially same as a correlated function between the detected waveform DW and the estimated waveform EW.

Figure 6:
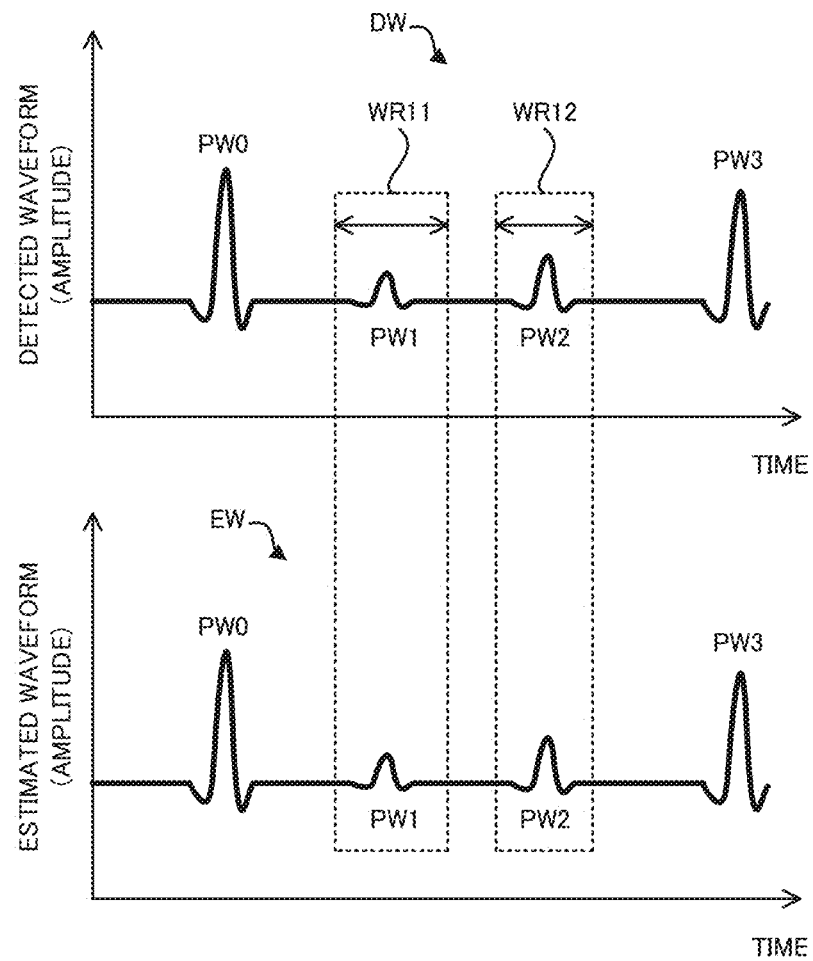
FIG. 6 is a waveform diagram that illustrates, on the detected waveform, a comparison target range that should be used to calculate a similarity degree in the first example.

In the first example, the position estimating part 1523 calculates a similarity degree R11 between the pulse wave PW1 in the detected waveform DW and the pulse wave PW1 in the estimated waveform EW. Thus, as illustrated in FIG. 6, the position estimating part 1523 designates a waveform range (in an example illustrated in FIG. 6, a waveform range designated on a temporal axis) including the pulse wave PW1 in the detected waveform DW and a waveform range including the pulse wave PW1 in the estimated waveform EW as comparison target ranges WR11 that should be compared with each other to calculate the similarity degree R11.

Moreover, the position estimating part 1523 calculates a similarity degree R12 between the pulse wave PW2 in the detected waveform DW and the pulse wave PW2 in the estimated waveform EW. Thus, as illustrated in FIG. 6, the position estimating part 1523 designates a waveform range (in an example illustrated in FIG. 6, a waveform range designated by a temporal range on a temporal axis) including the pulse wave PW2 in the detected waveform DW and a waveform range including the pulse wave PW2 in the estimated waveform EW as comparison target ranges WR12 that should be compared with each other to calculate the similarity degree R12.

The position estimating part 1523 may calculate the similarity degree R11 and the similarity degree R12 by using an existing method of calculating the similarity degree between two signal waveforms. The following equations 1 and 2 are one examples of the existing method. Note that a "$u_d(t)$" represents the amplitude of the detected waveform DW at a time t (note that the time t is a time included in the above described waveform range WR1 or the waveform range WR2), a "$u_e(t)$" represents the amplitude of the estimated waveform EW at the time t, a "$\mu_d$" represents an average value (what we call a DC component) of the amplitude of the detected waveform DW and a "$\mu_e$" represents an average value (what we call a DC component) of the amplitude of the estimated waveform EW in the equation 1 and the equation 2.

$$R11 \text{ or } R12 = \frac{\Sigma (u_d(t) - \mu_d)(u_e(t) - \mu_e)}{\sqrt{\Sigma (u_d(t) - \mu_d)^2} \sqrt{\Sigma (u_e(t) - \mu_e)^2}} \quad \text{[Equation 1]}$$

$$R11 \text{ or } R12 = \Sigma (u_d(t) - u_e(t))^2 \quad \text{[Equation 2]}$$

Then, the position estimating part 1523 calculates a similarity degree R on the basis of the similarity degree R11, the similarity degree R12, the clarity degree a1 and the clarity degree a2. Specifically, the position estimating part 1523 calculates the similarity degree R by using an equation of the similarity degree R=the similarity degree R11× the clarity degree a1+ the similarity degree R12× the clarity degree a2.

As described above, the clarity degree a1 is the index that becomes smaller as the pulse wave PW1 is more unclear (namely, the amplitude of the pulse wave PW1 becomes smaller). Thus, an operation for multiplying the similarity degree R11 by the clarity degree a1 to calculate the similarity degree R is equivalent to an operation for weighting the similarity degree R11 on the basis of the clarity degree a1. Namely, the operation for multiplying the similarity degree R11 by the clarity degree a1 to calculate the similarity degree R is equivalent to an operation for decreasing a contribution of the similarity degree R11 of the pulse wave PW1 to the calculation of the similarity degree R more as the pulse wave PW1 is more unclear.

Similarly, as described above, the clarity degree a2 is the index that becomes smaller as the pulse wave PW2 is more unclear (namely, the amplitude of the pulse wave PW2 becomes smaller). Thus, an operation for multiplying the similarity degree R12 by the clarity degree a2 to calculate the similarity degree R is equivalent to an operation for weighting the similarity degree R12 on the basis of the clarity degree a2. Namely, the operation for multiplying the similarity degree R12 by the clarity degree a2 to calculate the similarity degree R is equivalent to an operation for decreasing a contribution of the similarity degree R12 of the pulse wave PW2 to the calculation of the similarity degree R more as the pulse wave PW2 is more unclear.

The position estimating part 1523 executes the operation for calculating the similarity degree R with respect to each of the plurality of estimated waveforms EW (alternatively, one portion thereof) stored in the library 1522a. As a result, a plurality of similarity degrees R that correspond to the plurality of estimated waveforms EW are calculated.

Then, the position estimating part 1523 estimates the positions of the boundary surface B1 and the boundary surface B2 on the basis of the plurality of similarity degrees R calculated at the step S122 (a step S123). Specifically, the position estimating part 1523 determines the estimated waveform EW corresponding to the maximum similarity degree R of the plurality of similarity degrees R. The position estimating part 1523 estimates that the positions of the boundary surface B1 and the boundary surface B2 corresponding to the determined estimated waveform EW are the positions of the boundary surface B1 and the boundary surface B2, respectively.

As described above, the terahertz wave inspection apparatus 100 in the first example is capable of properly estimating the positions of the boundary surface B1 and the boundary surface B2. Especially, in the first example, the terahertz wave inspection apparatus 100 uses the clarity degree a1 and the clarity degree a2 to estimate the positions of the boundary surface B1 and the boundary surface B2. As a result, the terahertz wave inspection apparatus 100 is capable of properly estimating the positions of the boundary surface B1 and the boundary surface B2, even when the pulse waves PW1 and PW2 are not clear (for example, the amplitudes of the pulse waves PW1 and PW2 are so small that the pulse waves PW1 and PW2 are buried in the noise). Next, the reason will be described with reference to FIG. 7A and FIG. 7B.

Figure 7A:
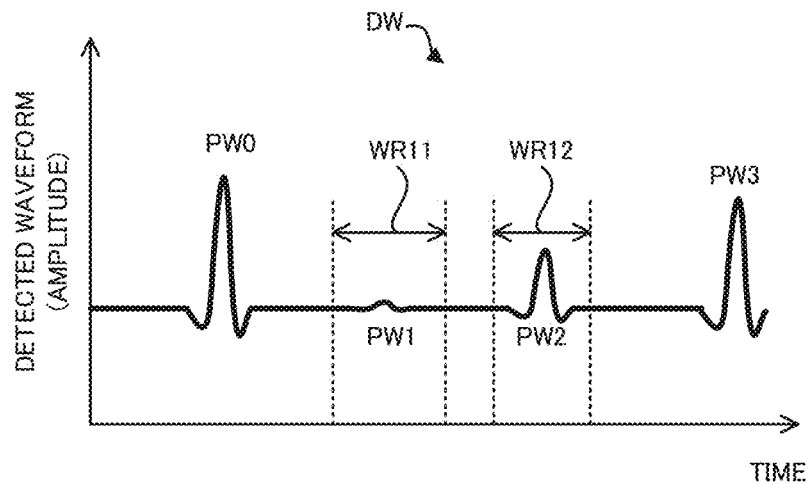
FIG. 7A is a waveform diagram that illustrates the detected waveform in which a certain pulse wave is not clear and FIG. 7B is a waveform diagram that illustrates the detected waveform in which all pulse waves are clear.

Firstly, FIG. 7A illustrates one example of the detected waveform DW in which the pulse wave PW1 is not clear (for example, the amplitude of the pulse wave PW1 is so small that the pulse wave PW1 is buried in the noise). Note that the pulse wave PW2 is clear (for example, the amplitude of the pulse wave PW2 is so large that the pulse wave PW2 is not buried in the noise) in FIG. 7A. In this case, there is a possibility that the waveform of the pulse wave PW1 varies every time the detected waveform DW is obtained because of a variation of a magnitude relationship between the pulse wave PW1 and the noise. As a result, there is a possibility that the similarity degree R11 of this pulse wave PW1 also varies every time the detected waveform DW is obtained. On the other hand, there is a low possibility that the waveform of the pulse wave PW2 varies every time the detected waveform DW is obtained. As a result, there is a low possibility that the similarity degree R12 of this pulse wave PW2 also varies every time the detected waveform DW is obtained.

Here, as one example, the similarity degree R that is calculated on the basis of the clarity degrees a1 and a2 (the similarity degree R in the first example) will be compared with the similarity degree R that is calculated not on the basis of the clarity degrees a1 and a2 (the similarity degree R in a first comparison example) by using an example in which the similarity R11 is 0.30±6 (note that 6 represents the variation (a dispersion)) and the similarity R12 is 0.98. In the first example, the clarity degree a1 is relatively small and the clarity degree a2 is relatively large, because the pulse wave PW1 is not clear. Here, when the clarity degree a1 is 0.1, the similarity degree R in the first example is 0.1×R11+0.9× R12=0.1× (0.30±G)+0.9×0.98=0.91±0.16. On the other hand, in the first comparison example, a contribution of the similarity degree R11 to the similarity degree R is same as contribution of the similarity degree R12 to the similarity degree R. Thus, the similarity degree R in the first comparison example is 0.5×R11+0.5×R12=0.5×(0.30±G)+0.5× 0.98=0.64±0.56. Therefore, the dispersion of the similarity degree R in the first comparison example is larger than the similarity degree R in the first example. Thus, there is a possibility that the estimated waveform EW corresponding to the maximum similarity degree R changes for every detection, and as a result, an accuracy of the estimation of the positions of the boundary surface B1 and the boundary surface B2 relatively deteriorates. However, the first example prevents the accuracy of the estimation of the positions of the boundary surface B1 and the boundary surface B2 from deteriorating, because the dispersion of the similarity R is relatively small.

Figure 7B:
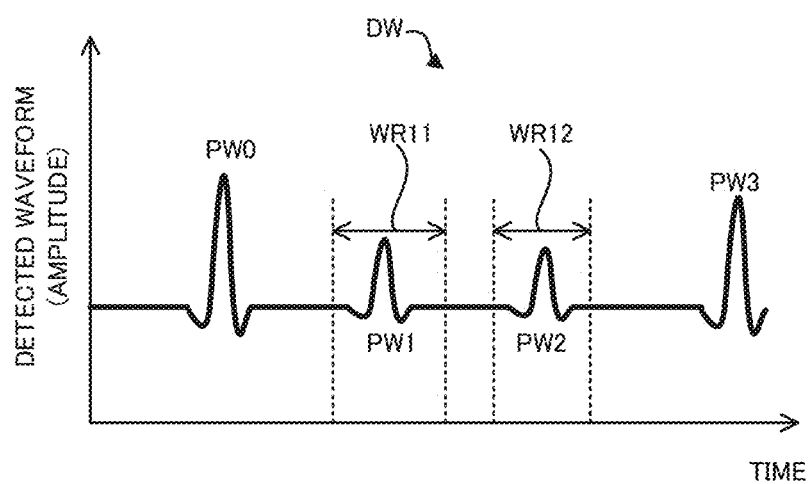

For reference, FIG. 7B illustrates an example of the detected waveform DW in which both of the pulse waves PW1 and PW2 are clear. In this case, a difference between the clarity degree a1 and the clarity degree a2 becomes smaller, compared to the case where at least one of the pulse waves PW1 and PW2 is not clear. Thus, when the pulse waves PW1 and PW2 are clear, the dispersions of both of the similarity degree R of the first example and the similarity degree R of the first comparison example become relatively small. Therefore, the estimation operation for estimating the positions of the boundary surface B1 and the boundary surface B2 on the basis of the clarity degree a1 and the clarity degree a2 is especially effective when at least one of the pulse waves PW1 and PW2 is not clear.

Note that the terahertz wave inspection apparatus 100 may be configured to estimate a position of not only the boundary surfaces B1 and B2 but also the rear surface B3 by executing an operation that is same as the operation for estimating the boundary surface B1 and the boundary surface B2. In this case, the terahertz wave inspection apparatus 100 calculates a clarity degree a2 of the pulse wave PW3 corresponding to the rear surface B3, calculates a similarity degree R13 of the pulse wave PW3 and calculates the similarity degree R on the basis of the similarity degree R13 and the clarity degree a3.

The clarity calculating part 1521 may not calculate at least one of the clarity degree a1 and the clarity degree a2 at the step S121 in FIG. 3. In this case, at least one of the clarity degree a1 and the clarity degree a2 may be designated manually by a user of the terahertz wave inspection apparatus 100. When both of the clarity degree a1 and the clarity degree a2 are designated manually by the user, the terahertz wave inspection apparatus 100 may not have the clarity calculating part 1521.

The position estimating part 1523 may determine the estimated waveform EW corresponding to the similarity degree R of the plurality of similarity degrees R that is equal to or larger than a predetermined threshold value TH at the step S123 in FIG. 3, instead of determining the estimated waveform EW corresponding to the maximum similarity degree R of the plurality of similarity degrees R. In this case, the predetermined threshold value TH is set to an appropriate value based on the similarity R that allows a state where a difference between the positions of the boundary surface B1 and the boundary surface B2 represented by the estimated waveform EW and the actual positions of the boundary surface B1 and the boundary surface B2 is small to be allowable because the detected waveform DW is relatively similar to the estimated waveform EW to be distinguished from a state where the difference between the positions of the boundary surface B1 and the boundary surface B2 represented by the estimated waveform EW and the actual positions of the boundary surface B1 and the boundary surface B2 is large not to be allowable because the detected waveform DW is not relatively similar to the estimated waveform EW.

Incidentally, although the terahertz wave inspection apparatus 100 detects the terahertz wave THz reflected by the sample S, the terahertz wave inspection apparatus 100 may detect the terahertz wave THz passing through the sample S.

(1-3) Modified Example

In the above described description, the terahertz wave inspection apparatus 100 estimates the characteristics of the sample S in which the three layers L (namely, the layer L1 to the layer L3) are laminated. However, the terahertz wave inspection apparatus 100 may estimate the characteristics of the sample S in which four or more layers L are laminated. Namely, the terahertz wave inspection apparatus 100 may estimate the position of the boundary surface B of the four or more layers that constitute the sample S. laminated.

Figure 8A:
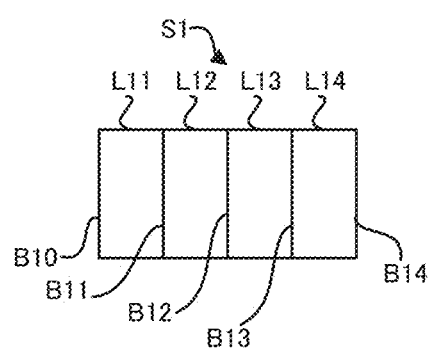
FIG. 8A is a cross-sectional diagram that illustrates a sample in which four layers are laminated and FIG. 8B is a waveform diagram that illustrate the detected waveform detected by irradiating the sample in which the four layers are laminated with the terahertz wave.
Figure 8B:
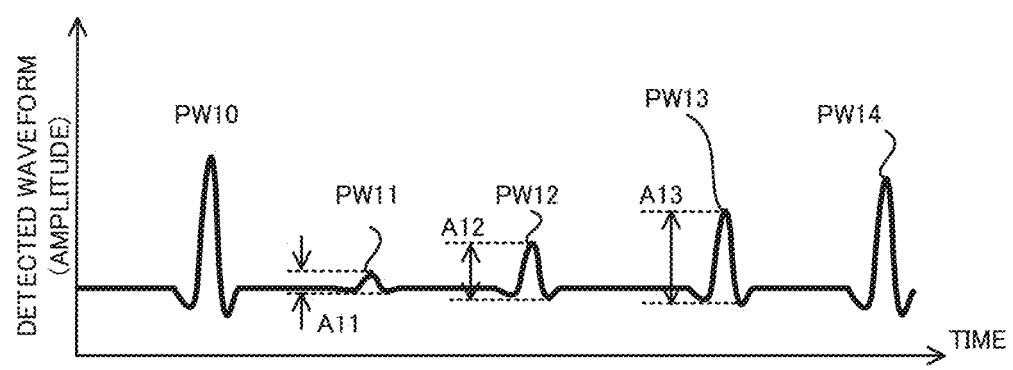

For example, FIG. 8A illustrates a sample S1 in which four layers L (specifically, a layer L11, a layer L12, a layer L13 and a layer L14) are laminated. A boundary surface B10 (namely, an outer surface B10) forms a boundary between the layer L11 and the outside of the sample S1. A boundary surface B11 forms a boundary between the layer L11 and the layer L12. A boundary surface B12 forms a boundary between the layer L12 and the layer L13. A boundary surface B13 forms a boundary between the layer L13 and the layer L14. A boundary surface B14 (namely, a rear surface B14) forms a boundary between the layer L14 and the outside of the sample S1. Moreover, FIG. 8B illustrates the detected waveform DW that is detected irradiating the sample S1 with the terahertz wave THz.

In this case, the terahertz wave inspection apparatus 100 may estimate a position of at least one of the boundary surface B11, the boundary surface B12 and the boundary surface B13 (moreover, the rear surface B14). However, in this case, the clarity calculating part 1521 calculates a clarity degree a11 of the pulse wave PW11 corresponding to the terahertz wave THz reflected by the boundary surface B11, a clarity degree a12 of the pulse wave PW12 corresponding to the terahertz wave THz reflected by the boundary surface B12 and a clarity degree a13 of the pulse wave PW13 corresponding to the terahertz wave THz reflected by the boundary surface B13. Specifically, the clarity calculating part 1521 calculates the clarity degree a11, the clarity degree a12 and the clarity degree a13 by using an equation of a11=A11/(A11+A12+A13), an equation of a12=A12/(A11+A12+A13) and an equation of a13=A13/(A11+A12+A13), wherein A11 represents the maximum amplitude of the pulse wave PW11, A12 represents the maximum amplitude of the pulse wave PW12 and A13 represents the maximum amplitude of the pulse wave PW13. Moreover, the position estimating part 1523 calculates the similarity degree R by using an equation of R=a11×R11+a12×R12+a13×R13, wherein R11 represents the similarity degree of the pulse wave PW11, R12 represents the similarity degree of the pulse wave PW12 and R13 represents the similarity degree of the pulse wave PW13.

Namely, the clarity calculating part 1521 calculates the clarity degree a of each of N pulse waves PW when the N pulse waves PW are used to estimate the position of a certain boundary surface B. In this case, the clarity degree a of each pulse wave PW is a ratio of the maximum amplitude of each pulse wave PW to a total sum of the maximum amplitudes of the N pulse waves PW. Moreover, the similarity calculating part 1523 calculates the similarity degree R by adding values that are obtained by multiplying the similarity degrees R of the N pulse waves PW with the clarity degree of the N pulse waves PW, respectively.

Moreover, the terahertz wave inspection apparatus 100 may estimate the characteristics of a sample S2 in which two layers L are laminated. Even in this case, there are two boundary surfaces including the rear surface of the sample S in the sample S2, and thus, the terahertz wave inspection apparatus 100 is capable of estimating the characteristics of the sample S2 by executing the above described operation.

(2) Terahertz Wave Inspection Apparatus 200 in Second Example

Next, with reference to FIG. 9 to FIG. 14B, a terahertz wave inspection apparatus 200 in a second example will be described.

(2-1) Structure of Terahertz Wave Inspection Apparatus 200

Figure 9:
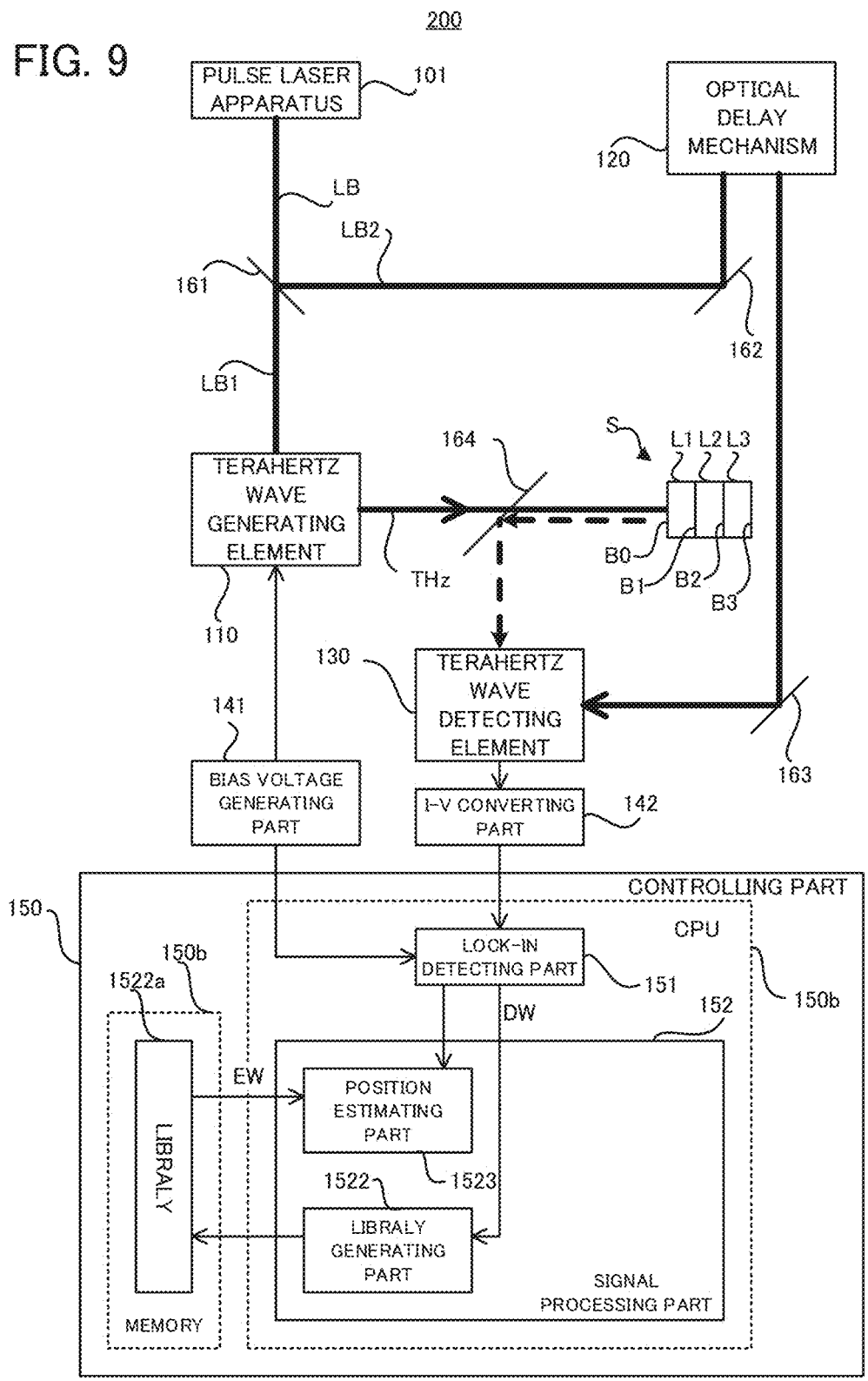
FIG. 9 is a block diagram that illustrates a structure of a terahertz wave inspection apparatus in a second example.

Firstly, with reference to FIG. 9, a structure of the terahertz wave inspection apparatus 200 in the second example will be described. FIG. 9 is a block diagram that illustrates the structure of the terahertz wave inspection apparatus 200 in the second example. Note that a detailed description of a component that is same as the component of the above described terahertz wave inspection apparatus 100 in the first example will be omitted by assigning the same reference number thereto.

As illustrated in FIG. 9, the terahertz wave inspection apparatus 200 is different from the terahertz wave inspection apparatus 100 in that the signal processing part may not have the clarity calculating part 1521. Another component of the terahertz wave inspection apparatus 200 may be same as another component of the terahertz wave inspection apparatus 100.

Moreover, the terahertz wave inspection apparatus 200 is different from the terahertz wave inspection apparatus 100 in that at least one portion of the operation of the position estimating part 1523 is different. Another operation executed by the terahertz wave inspection apparatus 200 may be same as another operation executed by the terahertz wave inspection apparatus 100.

(2-2) Estimation Operation for Estimating Position of Boundary Surface B1 and Boundary Surface B2 Executed by Terahertz Wave Inspection Apparatus 200

Figure 10:
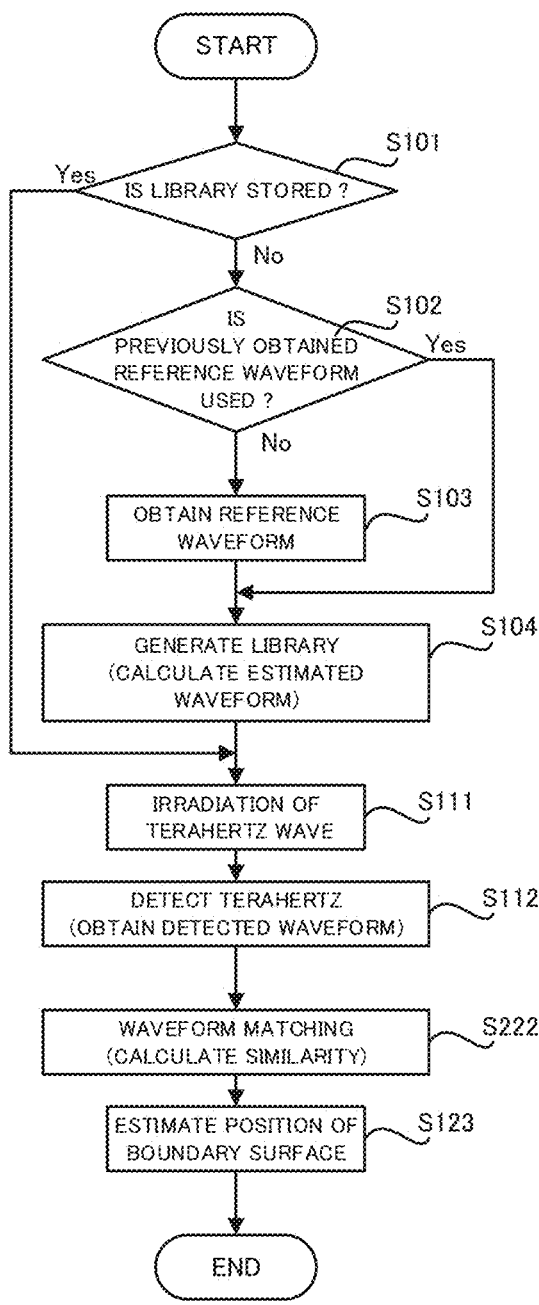
FIG. 10 is a flowchart that illustrates one example of a flow of an estimation operation for estimating the position of the boundary surface executed by the terahertz wave inspection apparatus in the second example.

Next, with reference to FIG. 10, the estimating operation for estimating the positions of the boundary surface B1 and the boundary surface B2 executed by the terahertz wave inspection apparatus 100 will be described. FIG. 10 is a flowchart that illustrates one example of a flow of the estimating operation for estimating the positions of the boundary surface B1 and the boundary surface B2 executed by the terahertz wave inspection apparatus 200. Note that a detailed description of the operation that is same as the operation executed by the above described terahertz wave inspection apparatus 100 in the first example will be omitted by assigning the same step number thereto.

As illustrated in FIG. 10, the terahertz wave inspection apparatus 200 executes the operation from the step S101 to the step S112, as with the terahertz wave inspection apparatus 100. Namely, when the library 1522a is not stored in the memory 150b, the library generating part 1522 generates the library 1522a (the step S101 to the step S104). Then, the terahertz wave generating element 110 emits the terahertz wave THz to the outer surface B0 of the sample S (the step S111). As a result, the terahertz wave detecting element 130 detects the terahertz wave THz reflected by the sample S (a step S112). Namely, the signal processing part 152 obtains the detected waveform DW (the step S112).

Then, the position estimating part 1523 executes a matching between the detected waveform DW obtained at the step S112 and the estimated waveform EW stored in the library 1522a (a step S222). Specifically, the position estimating part 1523 calculates the similarity degree R between the detected waveform DW and the estimated waveform EW.

Figure 11:
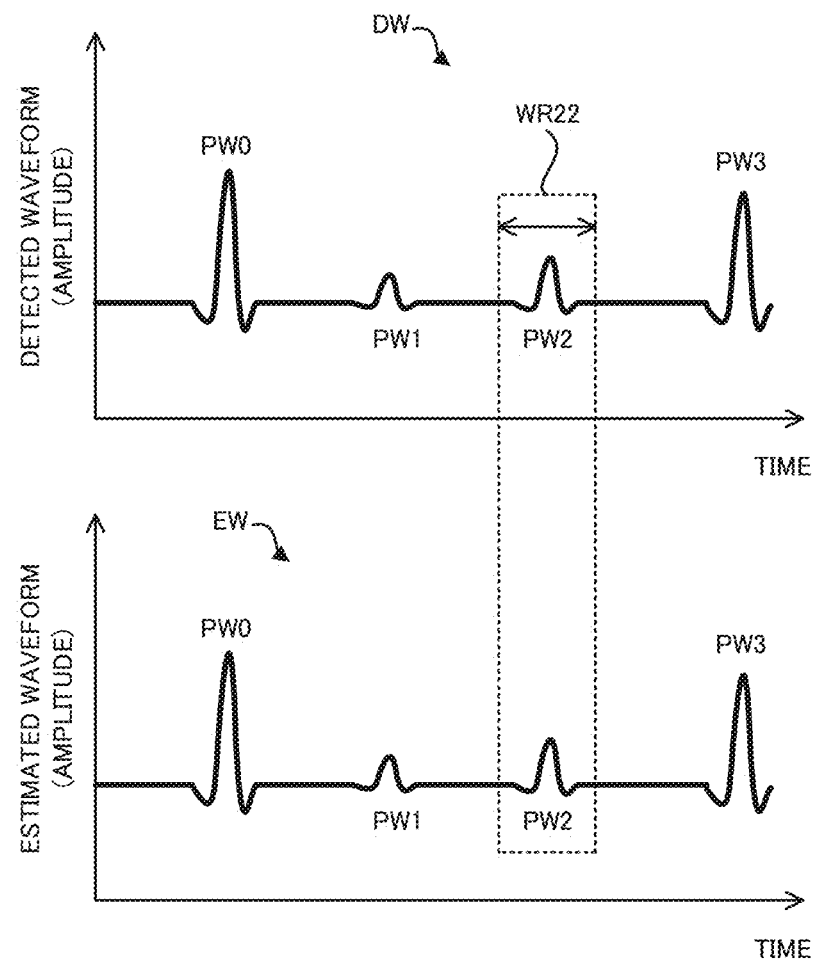
FIG. 11 is a waveform diagram that illustrates, on the detected waveform, the comparison target range that should be used to calculate the similarity degree in the second example.

In the second example, the position estimating part 1523 calculates a similarity degree R22 between the pulse wave PW2 in the detected waveform DW and the pulse wave PW2 in the estimated waveform EW in order to estimate the positions of the boundary surface B1 and the boundary surface B2. On the other hand, the position estimating part 1523 may not calculate a similarity degree R21 between the pulse wave PW1 in the detected waveform DW and the pulse wave PW1 in the estimated waveform EW in order to estimate the positions of the boundary surface B1 and the boundary surface B2. Namely, the position estimating part 1523 calculates the similarity degree R22 of the pulse wave PW2 corresponding to the boundary surface B2 that is farther from the outer surface B0 than the boundary surface B1 is, without calculating the similarity degree R21 of the pulse wave PW1 corresponding to the boundary surface B1, in order to estimate the position of the boundary surface B1. Thus, as illustrated in FIG. 11, the position estimating part 1523 designates a waveform range (in an example illustrated in FIG. 11, a waveform range designated on a temporal axis) that includes the pulse wave PW2 and that does not include the pulse wave PW1 in the detected waveform DW and a waveform range that includes the pulse wave PW2 and that does not include the pulse wave PW1 in the estimated waveform EW as comparison target ranges WR22 that should be compared with each other to calculate the similarity degree R22. Note that a method of calculating the similarity degree R22 may be same as a method of calculating each of the similarity degree R11 and the similarity degree R12 and thus its detailed description is omitted.

The position estimating part 1523 executes the operation for calculating the similarity degree R with respect to each of the plurality of estimated waveforms EW (alternatively, one portion thereof) stored in the library 1522a. As a result, a plurality of similarity degrees R22 that correspond to the plurality of estimated waveforms EW are calculated.

Then, the position estimating part 1523 estimates the positions of the boundary surface B1 and the boundary surface B2 on the basis of the plurality of similarity degrees R22 calculated at the step S122 (the step S123). Specifically, the position estimating part 1523 determines the estimated waveform EW corresponding to the maximum similarity degree R22 of the plurality of similarity degrees R22. The position estimating part 1523 estimates that the positions of the boundary surface B1 and the boundary surface B2 corresponding to the determined estimated waveform EW are the positions of the boundary surface B1 and the boundary surface B2, respectively.

As described above, the terahertz wave inspection apparatus 200 in the second example is capable of properly estimating the positions of the boundary surface B1 and the boundary surface B2. Especially, in the second example, the terahertz wave inspection apparatus 200 designates the waveform range that includes the pulse wave PW2 corresponding to the boundary surface B2 and that does not include the pulse wave PW1 corresponding to the boundary surface B1 as the comparison target range WR22 that should be compared to calculate the similarity degree R22, in order to estimates the positions of the boundary surface B1 and the boundary surface B2. Namely, the terahertz wave inspection apparatus 200 calculates the similarity degree R22 of the pulse wave PW2 and does not calculate the similarity degree R21 of the pulse wave PW1. Here, since the boundary surface B2 is farther from the outer surface B0 than the boundary surface B1 is, the pulse wave PW2 is a waveform that is obtained by the terahertz wave THz that passes through the boundary surface B1 and then is reflected by the boundary surface B2 (and then, passes through the boundary surface B1 again). Thus, the pulse wave PW2 must substantially include not only an information relating to the boundary surface B2 (for example, an information relating to the position of the boundary surface B2) but also an information relating to the boundary surface B1 (for example, an information relating to the position of the boundary surface B1). Thus, the terahertz wave inspection apparatus 200 is capable of properly estimating the positions of the boundary surface B1 and the boundary surface B2 on the basis of the similarity degree R22 of the pulse wave PW even when the pulse wave PW1 is not clear (for example, the amplitude of the pulse wave PW1 is so small that the pulse wave PW1 is buried in the noise).

Next, the reason will be described with reference to FIG. 12A to FIG. 13B. Note that an operation of estimating the positions of the boundary surface B1 and the boundary surface B2 by using the detected waveform DW in which the pulse wave PW1 is not clear and the pulse wave PW2 is clear will be described as one example in the following description.

Figure 12A:
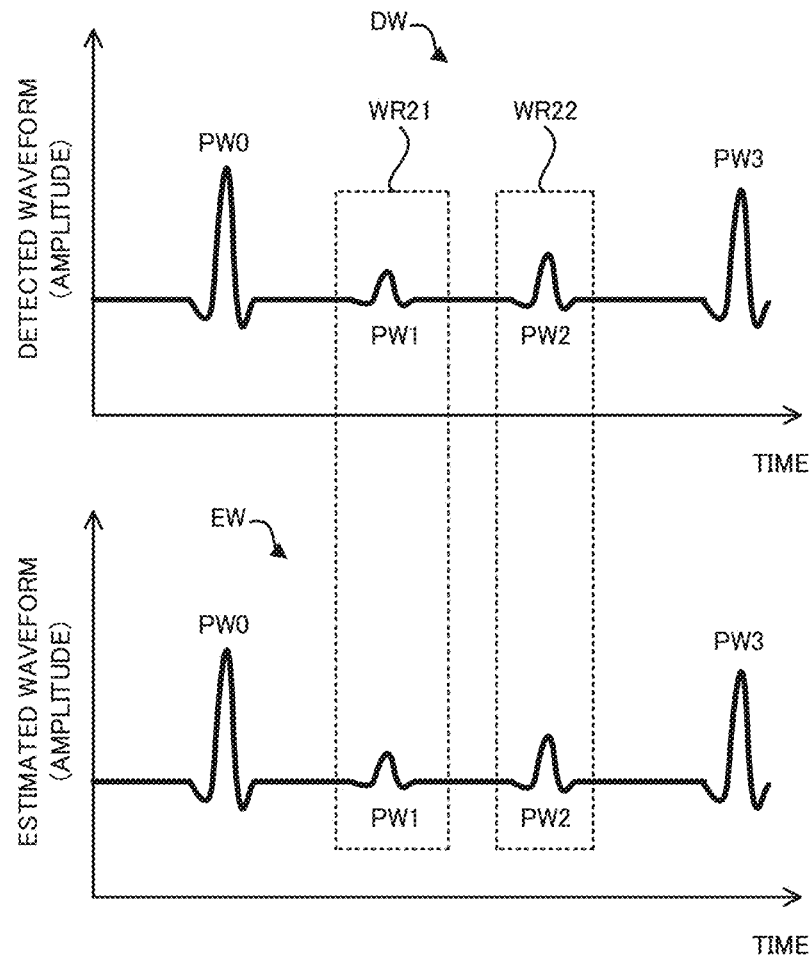
FIG. 12A is a waveform diagram that illustrates, on the detected waveform and the estimated waveform, the comparison target range in a second comparison example.

Firstly, FIG. 12A illustrates a comparison target range WR21 and the comparison target range WR22 designated by a terahertz wave inspection apparatus in a second comparison example. The terahertz wave inspection apparatus in a second comparison example designates a waveform range including the pulse wave PW1 corresponding to the boundary surface B1 as the comparison target range WR21 and designates a waveform range including the pulse wave PW2 corresponding to the boundary surface B2 as the comparison target range WR22, in order to estimates the positions of the boundary surface B1 and the boundary surface B2. Thus, the terahertz wave inspection apparatus in a second comparison example calculates the similarity degree R21 of the pulse wave PW1 and the similarity degree R22 of the pulse wave PW2, in order to estimates the positions of the boundary surface B1 and the boundary surface B2. Then, the terahertz wave inspection apparatus in a second comparison example calculates the similarity degree R by combining the similarity degree R21 and the similarity degree R22 by using an equation of the similarity degree R=0.5× the similarity degree R21+0.5× the similarity degree R22.

Figure 12B:
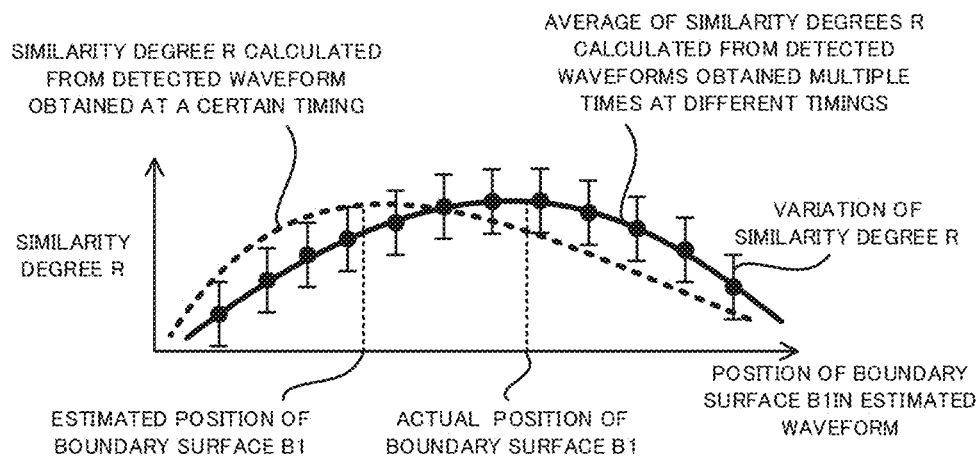
FIG. 12B is a graph that illustrates the similarity degree calculated at a certain timing in the second comparison example with an average of a plurality of similarity degrees calculated on the basis of a plurality of detected waveforms obtained at different timings, respectively.

Here, when the pulse wave PW1 is not clear, there is a possibility that the similarity degree R21 varies every time the detected waveform DW is obtained, as described in the first example. As a result, there is a possibility that the similarity degree R obtained by combining the similarity degree R21 and the similarity degree R22 also varies every time the detected waveform DW is obtained. Due to this variation (dispersion) of the similarity degree R, as illustrated in FIG. 12B, there is a possibility that the similarity degree R that is calculated from the detected waveform DW obtained at a certain timing is very different from an average of a plurality of similarity degrees R that are calculated from a plurality of detected waveform DW obtained multiple times at different timings, respectively. As a result, there is a possibility that the estimated position of at least one of the boundary surface B1 and the boundary surface B2 is very different from the actual position of at least one of the boundary surface B1 and the boundary surface B2, due to the variation (dispersion) of the detected waveform DW obtained from same sample S (especially, the variation (dispersion) of the pulse wave PW1 in the detected waveform DW).

Figure 13A:
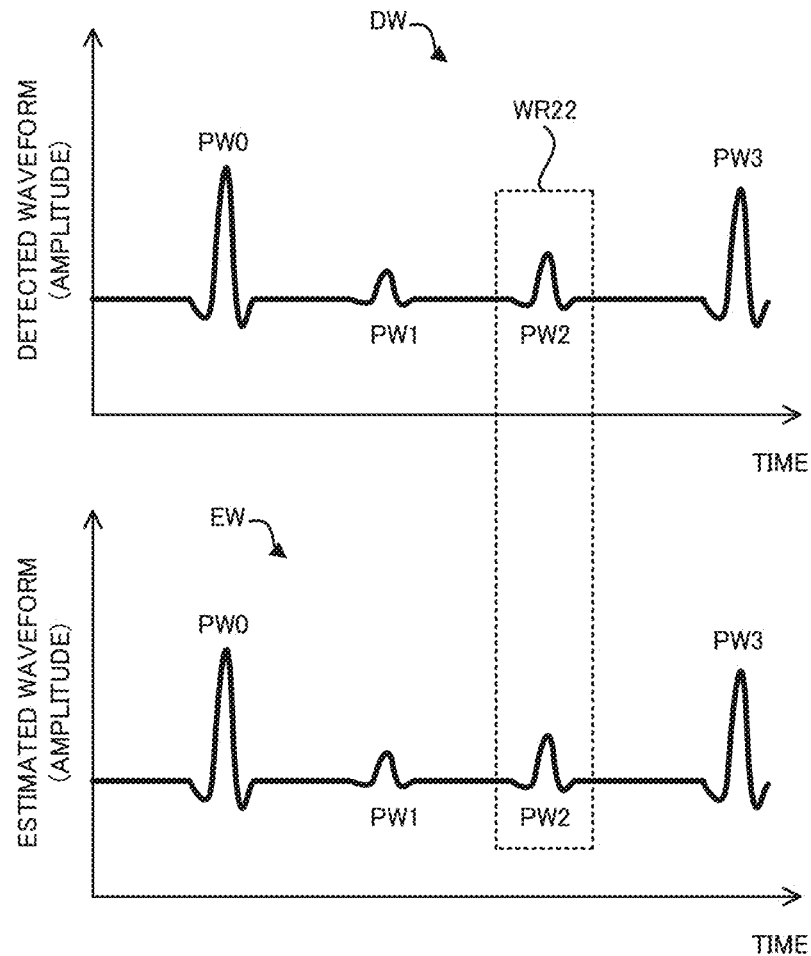
FIG. 13A is a waveform diagram that illustrates, on the detected waveform and the estimated waveform, the comparison target range in the second example.
Figure 13B:
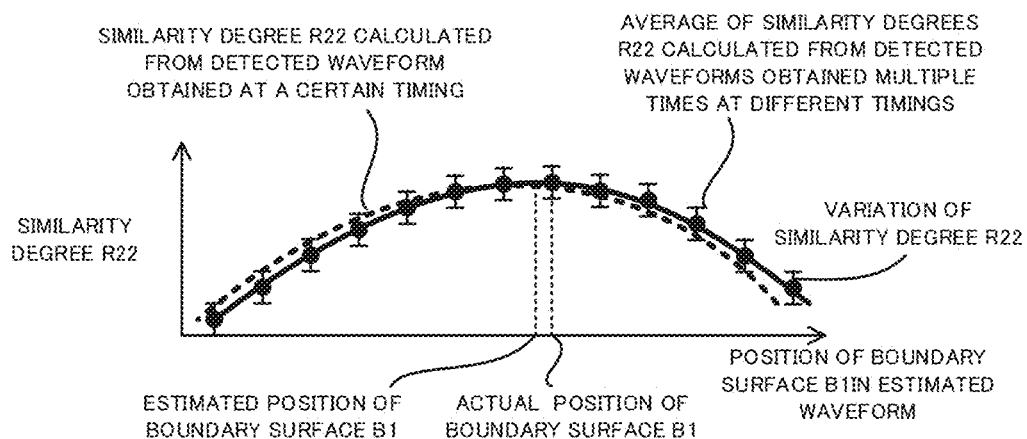
FIG. 13B is a graph that illustrates the similarity degree calculated at a certain timing in the second example with an average of a plurality of similarity degrees calculated on the basis of a plurality of detected waveforms obtained at different timings, respectively.

On the other hand, in the second example, as illustrated in FIG. 13A, the comparison target range WR21 is not used. Namely, the similarity degree R21 of the unclear pulse wave PW1 is not calculated. Thus, the terahertz wave inspection apparatus 200 estimates the positions of the boundary surface B1 and the boundary surface B2 by using the similarity degree R22. In this case, as illustrated in FIG. 13B, the variation (dispersion) of the similarity degree R22 is relatively small. Thus, there is a low possibility that the similarity degree R22 that is calculated from the detected waveform DW obtained at a certain timing is very different from an average of a plurality of similarity degrees R22 that are calculated from a plurality of detected waveform DW obtained multiple times at different timings, respectively. As a result, there is a low possibility that the estimated position of at least one of the boundary surface B1 and the boundary surface B2 is very different from the actual position of at least one of the boundary surface B1 and the boundary surface B2, regardless of the variation (dispersion) of the detected waveform DW obtained from same sample S (especially, the variation (dispersion) of the pulse wave PW1 in the detected waveform DW). As a result, the terahertz wave inspection apparatus 200 is capable of properly estimating the positions of the boundary surface B1 and the boundary surface B2.

Considering this technical effect of the second example, it can be said that the terahertz wave inspection apparatus 200 calculates the similarity degree R of the pulse wave PW corresponding to another boundary surface B that is farther from the outer surface B0 than one boundary surface B is and does not calculate the similarity degree R of the pulse wave PW corresponding to one boundary surface B, in order to estimate the position of one boundary surface B when the pulse wave PW corresponding to one boundary surface B is not clear. Therefore, the terahertz wave inspection apparatus 200 calculates the similarity degree R of the pulse wave PW corresponding to another boundary surface B (namely, at least one of the boundary surface B2 and the rear surface B3) that is farther from the outer surface B0 than the boundary surface B1 is and does not calculate the similarity degree R21 of the pulse wave PW1 corresponding to the boundary surface B1, in order to estimate the position of the boundary surface B1 when the pulse wave PW1 corresponding to the boundary surface B1 is not clear. Similarly, the terahertz wave inspection apparatus 200 calculates a similarity degree R23 of the pulse wave PW corresponding to another boundary surface B (namely, the rear surface B3) that is farther from the outer surface B0 than the boundary surface B2 is and does not calculate the similarity degree R22 of the pulse wave PW2 corresponding to the boundary surface B2, in order to estimate the position of the boundary surface B2 when the pulse wave PW2 corresponding to the boundary surface B2 is not clear.

However, the terahertz wave inspection apparatus 200 may determine, on the basis of a result of determining whether or not the pulse wave PW corresponding to one boundary surface B is clear, whether or not to calculate the similarity degree R of the pulse wave PW corresponding one boundary surface B in order to estimate the position of one boundary surface B. For example, the terahertz wave inspection apparatus 200 may calculate the similarity degree R of the pulse wave PW corresponding one boundary surface B in order to estimate the position of one boundary surface B when the pulse wave PW corresponding to one boundary surface B is clear. In this case, the terahertz wave inspection apparatus 200 estimates the positions of the boundary surface B1 and the boundary surface B2 by using the similarity R of the pulse wave PW corresponding to one boundary surface B. On the other hand, for example, the terahertz wave inspection apparatus 200 may not calculate the similarity degree R of the pulse wave PW corresponding one boundary surface B in order to estimate the position of one boundary surface B when the pulse wave PW corresponding to one boundary surface B is not clear. Note that a criteria that is used to determine whether or not the pulse wave PW is clear may be a criteria that the clarity degree a described in the first example is equal to or larger than a predetermined threshold value.

As one example, the terahertz wave inspection apparatus 200 may calculate the similarity degree R of the pulse wave PW corresponding to another boundary surface B (namely, at least one of the boundary surface B2 and the rear surface B3) that is farther from the outer surface B0 than the boundary surface B1 is and may not calculate the similarity degree R21 of the pulse wave PW1 corresponding to the boundary surface B1, in order to estimate the position of the boundary surface B1 when the pulse wave PW1 corresponding to the boundary surface B1 is not clear. On the other hand, the terahertz wave inspection apparatus 200 may calculate the similarity degree R21 of the pulse wave PW1 corresponding to the boundary surface B1, in order to estimate the position of the boundary surface B1 when the pulse wave PW1 corresponding to the boundary surface B1 is clear.

(2-3) Modified Example

In the above described description, the terahertz wave inspection apparatus 200 estimates the characteristics of the sample S in which the three layers L (namely, the layer L1 to the layer L3) are laminated. However, the terahertz wave inspection apparatus 200 may estimate the characteristics of the sample S in which four or more layers L are laminated. Namely, the terahertz wave inspection apparatus 200 may estimate the position of the boundary surface B of the four or more layers that constitute the sample S. laminated.

Figure 14A:
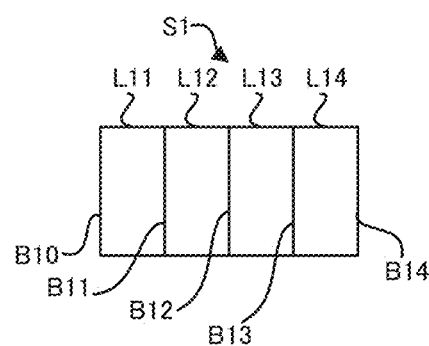
FIG. 14A is a cross-sectional diagram that illustrates the sample in which the four layers are laminated and FIG. 14B is a waveform diagram that illustrate the detected waveform detected by irradiating the sample in which the four layers are laminated with the terahertz wave.
Figure 14B:
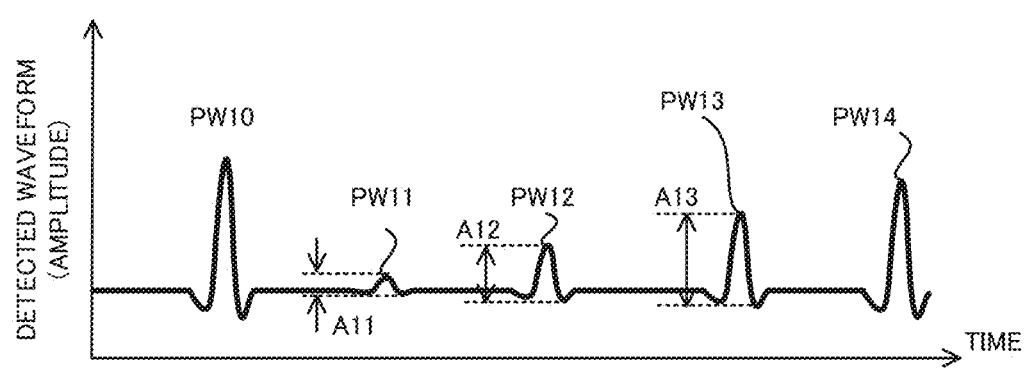

For example, FIG. 14A illustrates the sample S1 in which four layers L (specifically, the layer L11, the layer L12, the layer L13 and the layer L14) are laminated (namely, the sample that is same as the sample S1 illustrated in FIG. 8A). FIG. 14B illustrates the detected waveform DW that is detected irradiating the sample S1 with the terahertz wave THz. In this case, the terahertz wave inspection apparatus 200 may calculate the similarity degree R of the pulse wave PW corresponding to another boundary surface B (namely, at least one of the boundary surface B12, the boundary surface B13 and the rear surface B14) that is farther from the outer surface B10 than the boundary surface B11 is and may not calculate the similarity degree R of the pulse wave PW11 corresponding to the boundary surface B11, in order to estimate the position of the boundary surface B11. Similarly, the terahertz wave inspection apparatus 200 calculates the similarity degree R of the pulse wave PW corresponding to another boundary surface B (namely, at least one of the boundary surface B13 and the rear surface B14) that is farther from the outer surface B10 than the boundary surface B12 is and does not calculate the similarity degree R of the pulse wave PW12 corresponding to the boundary surface B12, in order to estimate the position of the boundary surface B12. Similarly, the terahertz wave inspection apparatus 200 calculates the similarity degree R of the pulse wave PW corresponding to another boundary surface B (namely, the rear surface B14) that is farther from the outer surface B10 than the boundary surface B13 is and does not calculate the similarity degree R of the pulse wave PW13 corresponding to the boundary surface B13, in order to estimate the position of the boundary surface B13.

When there are plurality of other boundary surfaces B each of which is farther than the outer surface B10 than one boundary surface B that is desired to be estimated is (namely, there are a plurality of pulse waves PW corresponding to other boundary surfaces B in the detected waveform DW), the terahertz wave inspection apparatus 200 may calculate the similarity degree R of one pulse wave PW of the plurality of pulse waves PW that satisfies a predetermined requirement and may not calculates the similarity degree R of the other pulse wave PW of the plurality of pulse waves PW.

The predetermined requirement may include a first requirement relating to the result of determining whether or not the pulse wave PW is clear. In this case, the terahertz wave inspection apparatus 200 may calculate the similarity degree R of one pulse wave PW of the plurality of pulse waves PW the clarity degree a of which is equal to or larger than a predetermined threshold value. Alternatively, the terahertz wave inspection apparatus 200 may calculate the similarity degree R of one pulse wave PW of the plurality of pulse waves PW that is the clearest.

The predetermined requirement may include second requirement that the boundary surface B corresponding to the pulse wave PW is the farthest from the outer surface B10. In this case, the terahertz wave inspection apparatus 200 may calculate the similarity degree R of one pulse wave PW of the plurality of pulse waves PW that is the farthest from the outer surface V10. Incidentally, there is high possibility that the pulse wave PW corresponding to the boundary surface B (namely, the rear surface B14) that is the farthest from the outer surface B10 is clearer than the pulse wave PW corresponding to the other boundary surface B. This is because the rear surface B13 is an end surface (a distal surface) of the sample S1 and thus faces a substance in a phase (for example, a gaseous phase) that is different from a phase (for example, a solid phase or a liquid phase) of a substance constituting the sample S1. As a result, a reflectance of the rear surface B14 with respect to the terahertz wave THz is relatively large and thus there is a high possibility that the pulse wave PW14 corresponding to the terahertz wave THz reflected by the rear surface B14 is clear (for example, the clearest).

Considering that the second requirement is used because there is a high possibility that the pulse wave PW corresponding to the boundary surface B that forms a boundary between the substances having the different phases, the predetermine requirement may include a third requirement that the pulse wave PW corresponds to the boundary surface B that forms a boundary between the substances having the different phases. In this case, the terahertz wave inspection apparatus 200 may calculate the similarity degree R of one pulse PW of the plurality of pulse waves PW that corresponds to the boundary surface B forming the boundary between the substances having the different phases. For example, the terahertz wave inspection apparatus 200 may calculate the similarity degree R of one pulse PW of the plurality of pulse waves PW that corresponds to the boundary surface B forming the boundary between the substance in the solid phase and the substance in the liquid phase. For example, the terahertz wave inspection apparatus 200 may calculate the similarity degree R of one pulse PW of the plurality of pulse waves PW that corresponds to the boundary surface B forming the boundary between the substance in the solid phase and the substance in the gaseous phase.

For example, the terahertz wave inspection apparatus 200 may calculate the similarity degree R of one pulse PW of the plurality of pulse waves PW that corresponds to the boundary surface B forming the boundary between the substance in the liquid phase and the substance in the gaseous phase.

When at least one of the first requirement to the third requirement is used as a criteria to determine one pulse wave PW of the plurality of pulse waves PW that is used to calculate the similarity degree R, the terahertz wave inspection apparatus 200 is capable of properly estimating the positions of the boundary surface B1 and the boundary surface B2 while improving the accuracy of the estimation of the boundary surface B1 and the boundary surface B2 (alternatively, preventing the deterioration of the accuracy of the estimation).

Moreover, the terahertz wave inspection apparatus 200 may estimate the characteristics of the sample S2 in which two layers L are laminated. Even in this case, there are two boundary surfaces including the rear surface of the sample S in the sample S2, and thus, the terahertz wave inspection apparatus 200 is capable of estimating the characteristics of the sample S2 by executing the above described operation.

Note that the terahertz wave inspection apparatus 200 may be provided with the component (for example, the clarity calculating part 1521) of the above described terahertz wave inspection apparatus 100 in the first example. The terahertz wave inspection apparatus 200 may execute the operation (for example, the operation for estimating the positions of the boundary surface B1 and the boundary surface B2 on the basis of the clarity degree a) executed by above described the terahertz wave inspection apparatus 100 in the first example. Namely, at least one portion of the component(s) described in the first example may be combined with at least one portion of the component(s) described in the second example. At least one portion of the operation described in the first example may be combined with at least one portion of the operation described in the second example. Alternatively, one portion of the component(s) described in the above described each example may not be used. One portion of the operation described in the above described each example may not be executed.

The present invention is not limited to the above described embodiment. The present invention may be changed without departing from the essence or spirit of the invention which can be read from the claims and the entire specification. Each of an inspection apparatus, an inspection method, a computer program and a recording medium each of which involves such changes is also intended to be within the technical scope of the present invention.

REFERENCE SIGNS LIST 100 terahertz wave inspection apparatus
101 pulse laser apparatus
110 terahertz wave generating element
120 optical delay mechanism
130 terahertz wave detecting element
141 bias voltage generating part
142 I-V converting part
150 controlling part
150a CPU
150b memory
151 lock-in detecting part
152 signal processing part
1521 clarity calculating part
1522 library generating part
1522a library
1523 position estimating part
161 beam splitter
162, 163 reflective mirror
164 half mirror
LB1 pump light
LB2 probe light
THz terahertz wave
S sample
L, L1, L2, L3, L11, L12, L13, L14 layer
B, B1, B2, B3, B11, B12, B13, B14 boundary surface
B0, B10 outer surface
B3, B14 rear surface
DW detected waveform
EW estimated waveform
BW reference waveform
PW0, PW1, PW2, PW3 pulse wave
a clarity degree

The invention claimed is:

1. An inspection apparatus comprising:
an irradiator that is configured to irradiate an outer surface of a sample in which a plurality of layers are laminated with a terahertz wave;
a detector that is configured to detect the terahertz wave from the sample to obtain a detected waveform; and
a controller that is programmed to estimate a position of a first boundary surface of the plurality of layers on the basis of a second boundary surface pulse wave and a library without using a first boundary surface pulse wave corresponding to the first boundary surface, the second boundary surface pulse wave appearing in the detected waveform to correspond to a second boundary surface of the plurality of layers, the second boundary surface being farther from the outer surface than the first boundary surface, the library indicating an estimated waveform of the terahertz wave from the sample.

2. The inspection apparatus according to claim 1, wherein the sample includes a plurality of second boundary surfaces,
the controller is programmed to estimate the position of the first boundary surface on the basis of one second boundary surface pulse wave of a plurality of second boundary surface pulse waves, the one second boundary surface pulse wave corresponds to one second boundary surface that forms a boundary between substances having different phases, the plurality of second boundary surface pulse waves appear in the detected waveform to correspond to the plurality of second boundary surfaces, respectively.

3. The inspection apparatus according to claim 1, wherein the sample includes a plurality of second boundary surfaces,
the controller is programmed to estimate the position of the first boundary surface on the basis of one second boundary surface pulse wave of a plurality of second boundary surface pulse waves, the one second boundary surface pulse wave corresponds to one second boundary surface that is the farthest from the outer surface, the plurality of second boundary surface pulse waves appear in the detected waveform to correspond to the plurality of second boundary surfaces, respectively.

4. The inspection apparatus according to claim 1, wherein the controller is programmed (i) to estimate the position of the first boundary surface on the basis of a first boundary surface pulse wave corresponding to the first boundary surface, the second boundary surface pulse wave and the library when a clarity degree of the first boundary surface pulse wave is larger than a second threshold value, and (ii) to estimate the position of the first boundary surface on the basis of the second boundary surface pulse wave and the library without using the first boundary surface pulse wave when the clarity degree of the first boundary surface pulse wave is smaller than the second threshold value.

5. An inspection method comprising:
an irradiating step at which a terahertz wave is irradiated to an outer surface of a sample in which a plurality of layers are laminated;
a detecting step at which the terahertz wave from the sample is detected to obtain a detected waveform; and
an estimating step at which a position of a first boundary surface of the plurality of layers is estimated on the basis of a second boundary surface pulse wave and a library without using a first boundary surface pulse wave corresponding to the first boundary surface, the second boundary surface pulse wave appearing in the detected waveform to correspond to a second boundary surface of the plurality of layers, the second boundary surface being farther from the outer surface than the first boundary surface, the library indicating an estimated waveform of the terahertz wave from the sample.

6. A non-transitory computer readable recording medium on which a computer program allowing a computer to execute the inspection method according to claim 5 is recorded.

* * * * *